United States Patent
Yohe et al.

(12) 
(10) Patent No.: US 6,615,275 B2
(45) Date of Patent: Sep. 2, 2003

(54) SYSTEM FOR INCREASING DATA ACCESS IN NETWORK HAVING COMPRESSION DEVICE FOR DETERMINING AND CONTROLLING DATA/OBJECT COMPRESSION BASED ON PREDETERMINED MAXIMUM PERCENTAGE OF CPU PROCESSING CAPACITY

(75) Inventors: Thomas Patrick Yohe, Dayton, OH (US); Jon J. Penner, Austin, TX (US); Scott Hertzog, Round Rock, TX (US); Brian C. Morris, Austin, TX (US)

(73) Assignee: Stampede Technologies, Inc., Dayton, OH (US)

(*) Notice: Subject to any disclaimer, the term of this patent is extended or adjusted under 35 U.S.C. 154(b) by 435 days.

(21) Appl. No.: 10/042,717

(22) Filed: Dec. 20, 2000

(65) Prior Publication Data

US 2003/0050996 A1 Mar. 13, 2003

Related U.S. Application Data

(63) Continuation-in-part of application No. 09/441,495, filed on Nov. 17, 1999, now Pat. No. 6,339,787, which is a continuation-in-part of application No. 08/956,190, filed on Oct. 22, 1997, now Pat. No. 6,012,085, which is a continuation-in-part of application No. 08/888,311, filed on Jul. 3, 1997, now Pat. No. 5,835,943, which is a continuation-in-part of application No. 08/565,393, filed on Nov. 30, 1995, now Pat. No. 5,682,514.

(51) Int. Cl.[7] .............................................. G06F 15/16
(52) U.S. Cl. ........................ 709/247; 709/217; 709/218
(58) Field of Search ................................. 709/247, 217, 709/218

(56) References Cited

U.S. PATENT DOCUMENTS

| | | | | |
|---|---|---|---|---|
| 5,964,842 A | * | 10/1999 | Packard ...................... | 709/247 |
| 6,032,197 A | * | 2/2000 | Birdwell et al. ............. | 709/247 |
| 6,163,811 A | * | 12/2000 | Porter ......................... | 709/247 |
| 6,286,053 B1 | * | 9/2001 | Van Peursem et al. ..... | 709/247 |
| 6,311,224 B1 | * | 10/2001 | Packard ...................... | 709/247 |
| 6,345,307 B1 | * | 2/2002 | Booth ......................... | 709/247 |
| 6,385,656 B1 | * | 5/2002 | Appelman .................. | 709/247 |
| 6,438,610 B1 | * | 8/2002 | Pearson et al. ............. | 709/247 |

* cited by examiner

Primary Examiner—Krisna Lim
(74) Attorney, Agent, or Firm—R. William Graham

(57) ABSTRACT

An apparatus for increased data access from data of the type including at least one of a file, an object and a directory in a file/object oriented network comprises a compression device having means for determining when processing said CPU reaches a predetermined percentage of maximum processing capacity, and means operably associated with said determining means for controlling compression of data/object upon reaching said predetermined percentage in a manner to aid processing to fall below said predetermined percentage.

13 Claims, 22 Drawing Sheets

SYSTEM FOR INCREASING DATA ACCESS IN NETWORK HAVING COMPRESSION DEVICE FOR DETERMINING AND CONTROLLING DATA/OBJECT COMPRESSION BASED ON PREDETERMINED MAXIMUM PERCENTAGE OF CPU PROCESSING CAPACITY

This is a continuation-in-part of U.S. Ser. No. 09/441,495 filed Nov. 17, 1999, now a U.S. Pat. No. 6,339,787 issued on Jan. 12, 2002, which is a continuation-in-part of U.S. Ser. No. 08/956,190 filed Oct. 22, 1997, now a U.S. Pat. No. 6,012,085 issued on Jan. 4, 2000, which is a continuation-in-part of U.S. Ser. No. 08/888,311 filed Jul. 3, 1997, now a U.S. Pat. No. 5,835,943 issued on Nov. 10, 1998, which is a continuation-in-part of U.S. Ser. No. 08/565,393 filed Nov. 30, 1995, now a U.S. Pat. No. 5,682,514 issued on Oct. 28, 1997.

BACKGROUND OF THE INVENTION

1. Field of the Invention

The present invention relates to data access in a file/object oriented network system. More particularly, the present invention is directed to a client-agent-server utility which increases the speed in which data in the form of files, objects and directories are accessed across slow link communications via remote node caching and provides verification, selective object compression, processor capacity monitoring in order to disable process intensive components such as compression, selective prefetch and concatenation of fresh objects and indicators of cache correctness.

2. Related Art

There exist operating systems which are equipped to handle caching and verifying as well as compression of data. Traditionally, in a remote client's caching system, optimization in retrieving data is limited to prefetching. In other words an application program in a remote client requests from a file server transmission of a predetermined number of bytes of information (e.g., x bytes) and the operating system on the client prefetches the requested data plus another number of bytes of information (e.g., x+y bytes). Thus, when the application requests the bytes, it already exists in its readily accessible memory (cache).

In addition, there also exist problems with verification of directories in existing systems. It has been found, for example, that two remote clients concurrently accessing data and attempting to verify a directory will not necessarily obtain the same data due to the fact that the data from the file server computer will not necessarily send out the data in the same order to each of the remote clients. Thus, there is no clear indication whether the directory data is current.

In a desktop caching system, a high speed memory is used to cache data that is stored on a hard disk. While a desk-top cache program, such as Microsoft's SmartDrive, is a useful tool to increase performance from the random access memory (RAM), this type of caching technique is not applicable to remote environments because of its inability to correctly handle multiple remote clients accessing the same data files concurrently, i.e., it is likely to corrupt the data.

File servers have employed caching techniques which parallel techniques of the desktop. Here, the file server deviates in protecting against multiple common data user access by implementing or providing a file locking service to clients.

Many object oriented network systems include web browsers which commonly manifest themselves on an object retrieval side of the remote client, such as Netscape's Navigator or as Lotus Notes clients, and include web servers which commonly manifest themselves on the object server side, such as Notes servers, are equipped to maintain a cache of objects to avoid unnecessary retrieval of objects from a network of object providers. Cache correctness is determined through a given technique.

Many existing object oriented network systems employ inefficient data communication protocols to transfer object updates to replicas of an object collection. For example, during the replication process that takes place between a Lotus Notes™ client and server each object update is requested separately which results in extra packet exchanges and inefficiency.

Existing object oriented network systems often employ a client-agent-server utility (the "agent") to further reduce unnecessary retrieval of objects from a network of object provider. These agents are often termed as "proxy servers" since they retrieve objects from a network of object providers on behalf of a set of clients. In this situation, the agent maintains a cache of objects and monitors and responds to object retrieval requests from one or more remote clients. The agent may fulfill the request which emanates from a client by retrieving the object from its cache rather than forwarding the request to the network of object providers.

As shown in FIG. 1, the related art includes a remote client computer having an operating system (OS) with a file system interface (FSI). Operatively connected to the FSI is a local file system (LFS) which in turn is operatively connected to a RAM based disk cacher (RBDC), disk driver (DD) and permanent storage disk (PSD). The PSD may include object retrieval application cache (ORAC) and object collection Replicas (OCRs).

Object retrieval applications (ORAs) exist in the remote client which have the ability to retrieve objects and to store OCRs into the PSD via the LFS via the FSI. These OCRs are retrieved through an Object Retrival/Storage interface (ORSI) which employs an Object Retriever (OR).

Operatively connected to the FSI is a network file redirector (NFR) with prefetch capability, and a network transport layer (NTL) connected to a WAN driver. Aside from the OS, there exist application programs (AP) which employs the OS via the FSI. A communication server (CS) connects to the remote client computer and includes a WAN. driver, routing layer and LAN driver. The CS connects through a LAN link to a file server computer.

The file/object server computer has an OS. The file/object server computer OS includes an NTL connected to a LAN driver and an FSI connected to LFS which in turn is connected to an RBDC, a DD and a PSD. Aside from the OS, there exists a file/object server application which employs the OS via the FSI.

An object proxy server (OPS) may also exist operatively connected to the communication server and the file object server. The OPS includes and ORSI, and OR, NTL, LAN driver, FSI, RBDC and DD as shown in FIG. 1. The OPS maintains an object cache for the purpose of maintaining an object cache on PSD via an FSI. The OPS retrieves objects via an ORSI which is operatively connected to an Object Retriever (OR).

A further problem associated with these prior systems is their inability to provide a remote client user with greater speed of access to object collection updates because of inefficient or "chatty" data communication protocols. This chattiness usually manifests itself in extra packet exchanges to accomplish the communication of the object collection updates by requesting each object update individually. In a satellite based communication link, latency is an important factor where the send/receive acknowledgment cycle of even the smallest data unit can take several seconds to accomplish.

The problem associated with these prior systems is their inability to provide a remote client user with greater speed of access to file/object server data and/or file/object server directories. This is especially so because of the type of link in which the remote client may be accessing the data through, such as a modem phone link. In the context of the present invention, "remote client" is defined as a user, accessing data over a relatively slow link, such as a modem phone link. A typical modem phone link provides a transfer rate of about 28.8 kilobits of information per second. This is contrasted with a link in a LAN connection which can transfer at about 10 Megabits per second. These remote clients are thus greatly limited in speed of access.

As described in a parent application, an incoherent data with the that of the file/object server, employs a compression mechanism for transmitting the "flesh" block of data to the remote client. This provided performance gains via using a method of concatenating the object updates into a contiguous stream of data and intelligently applying data compression to the portions of the data stream which would benefit from the compression. The determination of when to apply data compression is based on weighing the benefits of the data reduction that would be achieved and the speed of the communication link versus the time it would take to perform the data compression, IE the slower the communication link and the more data reduction that would be achieved, the more likely that data compression will be applied to the data stream.

While these improvements have aided the speed of access in data over a network, there remains a need to improve the speed in which data is transferred. Accordingly, the invention at hand is directed at maintaining high speed data transfer while protecting the integrity of operability of the server computer.

SUMMARY OF THE INVENTION

The present invention improves remote clients access and verification of objects and data in files and directories through a file/object oriented network environment.

It is an object to maintain optimized speed in which a remote client can access data and directories through a server.

It is another object to maintain integrity of the accessed data and directory while increasing the speed in which the data is accessed.

Still, another object is to add intelligence to a server computer in order to reduce the overall time in which a remote client accesses data while also maintaining integrity thereof.

Other objects and advantages will be readily apparent from reading the following description and viewing the drawings.

Accordingly, one aspect of the invention is directed to a file/object server CPU having which utilizes a data/object compression, which includes a compression device having means for determining when processing the CPU reaches a predetermined percentage of maximum processing capacity, and means operably associated with the determining means for controllably employing compression of data/object upon reaching said predetermined percentage in a manner to aid processing to fall below said predetermined percentage.

The compression device further includes means for enabling compression of data/objects upon falling below the predetermined percentage. The determining means is further characterized to monitor the processing capacity over time, which can be periodic. The determining means is characterized to include means for evaluating average process usage percentage of data/object to be compressed prior to compression.

Terminology

"Caching" is the function of retrieving an object from a relatively high speed storage device from a list of most-recently-used objects.

"Cache" is a file which resides in permanent storage and contains the most-recently-used blocks of data read from a remote file/object server.

"Compression" can mean front and/or rear compression and can include a single or number techniques which amounts in condensing the data/objects in order to render more efficient transfer thereof.

"Data" referred to herein is inclusive of an object, directory and/or a file.

"File/object oriented distributed network," as used in the present invention, will include a network wherein the file/object server computer data is accessed via the following set of file system or object retrieval primitives: OPEN, CREATE, READ, WRITE, SEEK, LOCK, UNLOCK, CLOSE, DIRECTORY REQUEST, GET OBJECT, and SYNCHRONIZE COLLECTION REPLICATION.

"File" means a collection of related data records treated as a basic unit of storage.

"File/Object Server Computer" is a computer which includes a processor with its associated memory, an operating system, and a permanent storage memory.

A cached object is considered "stale" if it is found to be incoherent with the actual object as stored on the file/object server.

A cached object is considered "fresh" if it is found to be coherent with the actual object as stored on the object server.

A "Handle" is the internal address of a unique data structure that describes characteristics about a file, object, object collection or object database.

An "Object" is a sequence of data of variable length.

An "Open Method" is an indicator of the actions that a program will take after opening a file or object database. The actions may be one or more of, but not limited to, read-only, write-only, open-for program execution only, open exclusively, open with the intention of locking regions prior to update, etc.

"Permanent storage memory," as used herein, includes, but is not limited to, disk drive, flash RAM or bubble memory, for example.

"Replication" is the process of exchanging modifications between replicas of a collection of objects.

A "Reverse Channel" is the means by which a response message is sent over the same network layer interface in which a request was received.

A "Sub-object" is a portion of an Object.

A "Validator" is a relatively short stream of data which is returned by an object server along with all object which is to be presented to the object server for purposes of validating the requestor's object cache.

A "chatty" replication data communication protocol is one where extra packet exchanges are used to request each object update from a set of object collection updates individually.

"Streaming" is the method of concatenating a collection of objects into a larger object for the purposes of more efficient data communications by eliminating the overhead packets and communication latency associated with the transfer of objects on an individual basis.

DETAILED DESCRIPTION OF A PREFERRED EMBODIMENT

Figure 1:
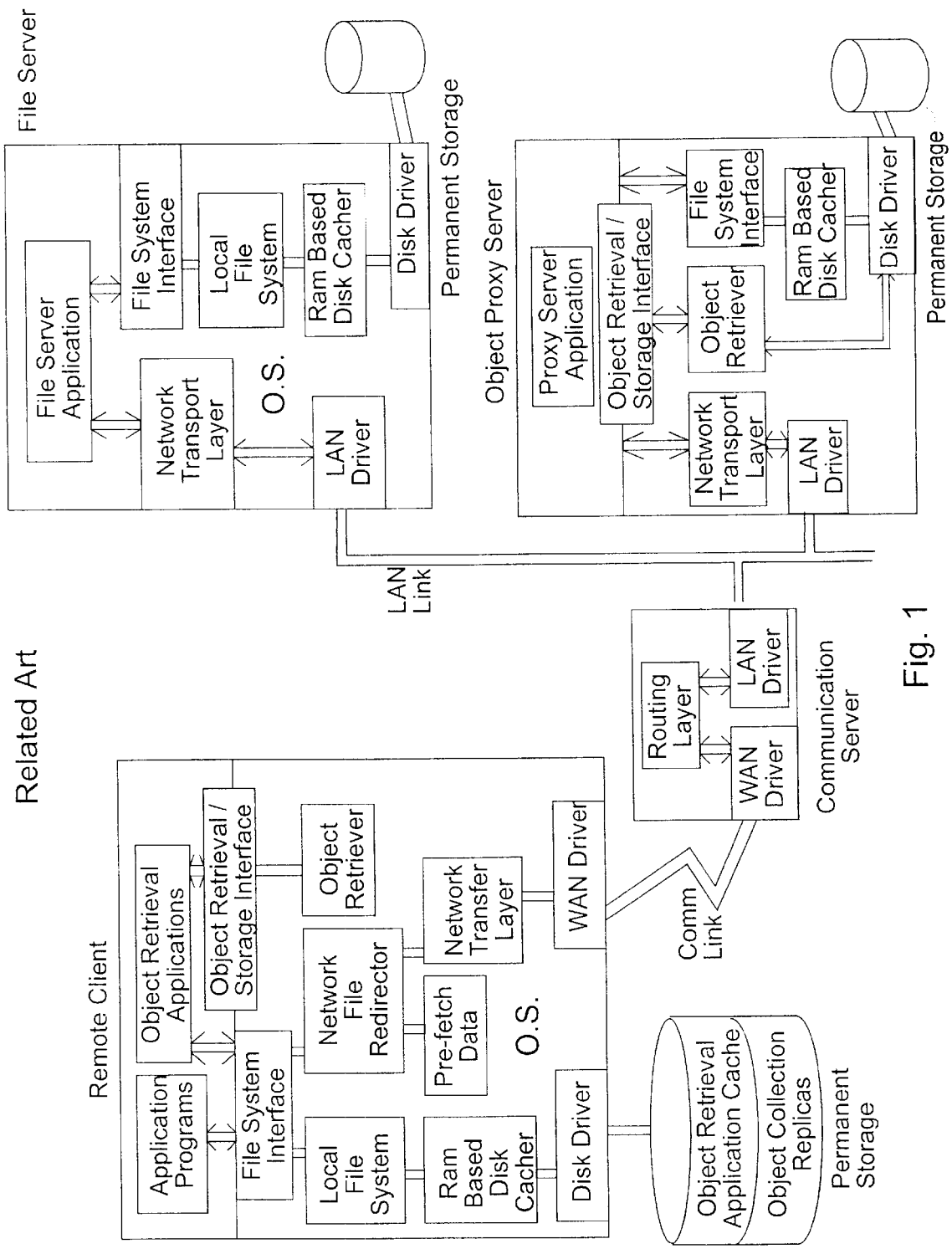
FIG. 1 illustrates the block diagram configuration of the related art.

In the description which follows, the representation of the present invention is in part presented in terms of program operations executed on a file/object oriented distributed network of computers, but may as well be applicable to distributed file/object oriented network systems. The operations are steps leading to a certain result. Typically, these steps take the form of electrical signals which are manipulated, stored, transmitted, combined, compared or otherwise operated upon by a particular computer in the network. For simplicity, these signals may be referred to herein as bits, bytes or data.

The following description describes solutions to the problems associated with a remote client computer's ability to access specified data from a file, an object or directory of a file/object server computer located on a network or world wide web. An apparatus and method are disclosed which permit the remote client computer to reduce the time for accessing such data using a cache verifying computer coupled with a caching technique.

The performance gains realized by the present invention are derived from the fact that remote clients tend to repetitively access the same data by performing file reads or object retrievals. If a copy of the data can be stored in the permanent storage memory of the remote client computer and also verified to be current when it is subsequently retrieved, this will improve performance significantly. This is because it requires in such less bandwidth to verify a block of data than it would to actually transfer a block of data. Furthermore when a block of cached data is deemed to be incoherent with the that of the file/object server, the present invention employs a compression mechanism for transmitting the "fresh" block of data to the remote client.

The performance gains realized by the present invention are further derived from the fact that existing inefficient methods of transferring object replica updates with a "chatty" replication communication protocol are replaced with a method of concatenating the object updates into a contiguous stream of data and intelligently applying data compression to the portions of the data stream which would benefit from the compression. The determination of when to apply data compression is based on weighing the benefits of the data reduction that would be achieved and the speed of the communication link versus the time it would take to perform the data compression, IE the slower the communication link and the more data reduction that would be achieved, the more likely that data compression will be applied to the data stream.

Referring now to the FIGS. 2–23, the present invention is a network computer system 10 having at least one remote client computer 12, cache verifying computer 14, communication server 16 and file/object server computer 18. The cache verifying computer 14 and file/object server computer 18 are connected via a local area network (LAN) link 20. The communication server 16 links the remote client computer 12 to the LAN 20, which in turn permits communication with the cache verifying computer 14 and the file/object server compute 18.

The remote client computer 12 communicates via communication link 22 to the communication server 16. The communication server 16 can be of a type such as that provided by Cisco, 3Com, Shiva, etc., which will act as a router of traffic between the LAN 20 and communication link 22 and convert data through the LAN 20. The LAN 20 can be Ethernet or Token Ring, for example.

The remote client computer 12 has an operating system (OS) 24 with a file system interface (FSI) 26. Operatively connected to the FSI 26 is a local file system (LFS) 28 which in turn is operatively connected to a RAM based disk cacher (RBDC) 30, disk driver (DD) 32 and permanent storage disk (PSD) 34. The PSD 34 includes object retrieval application cache (ORAC) 34a and object collection replicas (OCRs) 34b. A network file redirector (NFR) 36 with prefetch data 37, operatively connects to a network transport layer (NTL) 38 which in turn is connected to a WAN driver 40.

A network file/object cacher (NFOC) 42 is operably disposed between and interconnects the FSI 26 and NFR 36. The NFOC 42 has operatively associated therewith a directory cacher (DC) 43 and directory signature comparator (DSC) 49.

The NTL 38 operatively connects to the NFOC 42. Also, the NFOC 42 operatively connects to the LFS 28. The NFOC 42 includes a block signature generator (BSG) 44 and hit ratio analyzer (HRA) 45, which will be more fully described hereinafter. Aside from the OS 24, there exists on the remote client computer 12 application programs (AP) 46 which employ the OS 24 via FSI 26.

The remote client computer 12 also has object retrieval applications (ORAs) 31 which are operatively connected to an object retrieval/storage interface (ORSI) 27 which is in turn is operatively connected to the object retriever (OR) 39 via the NFOC 42. The OR 39 operatively connects to NTL 28. The NFR 36 operatively connects to a file signature retriever (FSR) 33, wherein the file signature may include the time that the file was last modified, for example. Likewise, the OR 39 operatively connects to an object signature retriever (OSR) 35. The NFOC 42 also has operatively associated therewith a local comparator (LC) 13, a compressor/decompressor (CD) 47, a caching filter (CF) 50, a replication synchronizer (RS) 41 and an object cache evaluator (OCE) 29. Each said OCE are exemplified in the packet formats set forth hereinafter.

The communication server (CS) 16 includes a WAN driver 48, a LAN driver 50 and routing layer (RL) 52 operatively interconnecting the WAN driver 48 and the LAN 50 driver.

The cache verifying computer 14 includes a cache verifying agent (CVA) 54 having a BSG 56 (of the type described herein), a directory signature generator (DSG) 57 and a comparator 58. The CVA 54 also includes operatively associated therewith CD 51 an object cacher (OC) 59, a replication analyzer (RA) 53 and an associated object retriever (AOR) 55, wherein the replication analyzer RA 53 is located on the remote client RC 12 and synchronizer 41 is located on the verifier computer 14. The function of the replication analyzer is to determine a list of document updates that should be moved in the data transfer, this is often accomplished by analyzing a list of document updates supplied by ORA (31).

Figure 2:
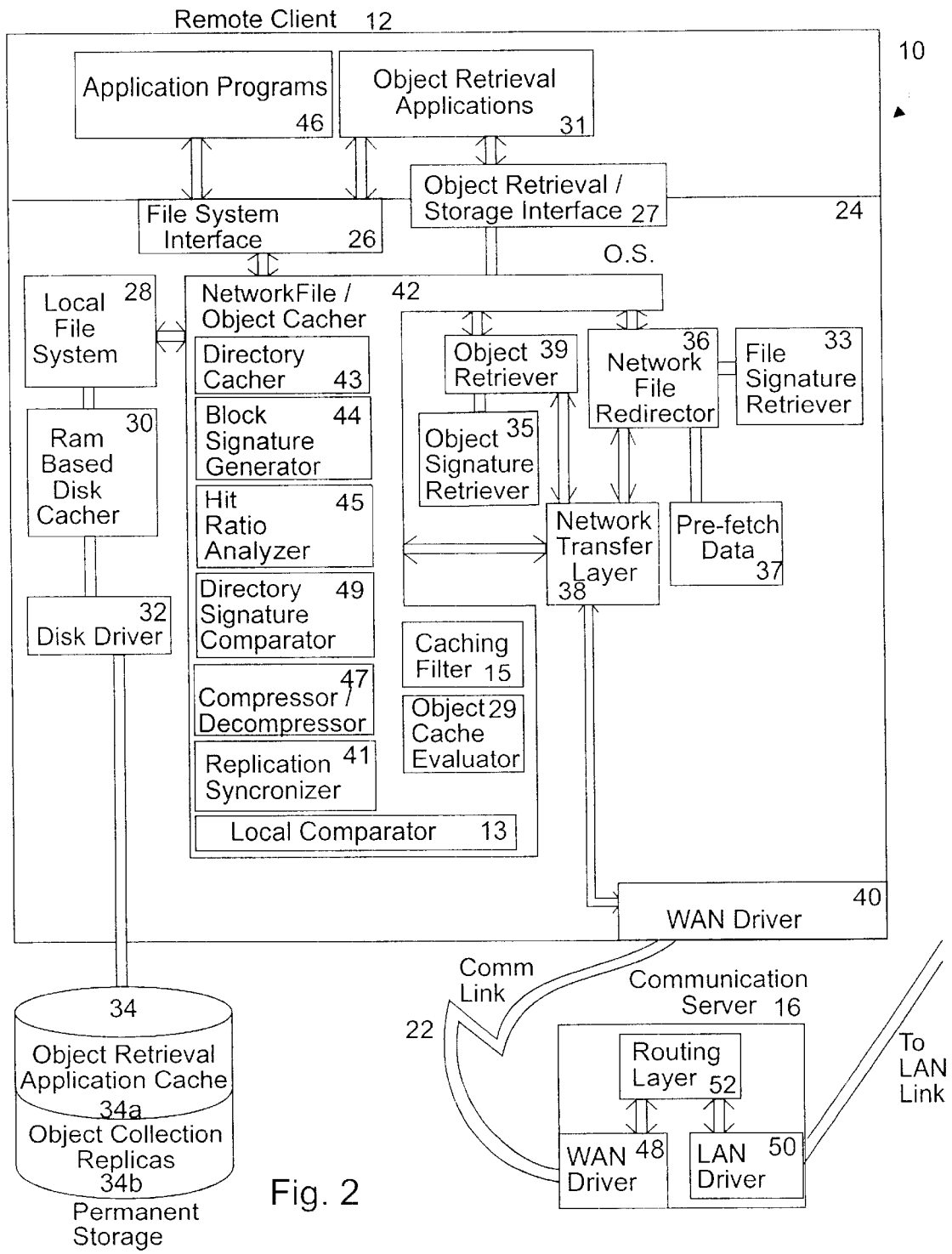
FIG. 2 illustrates the block diagram configuration of the present invention.
Figure 2:
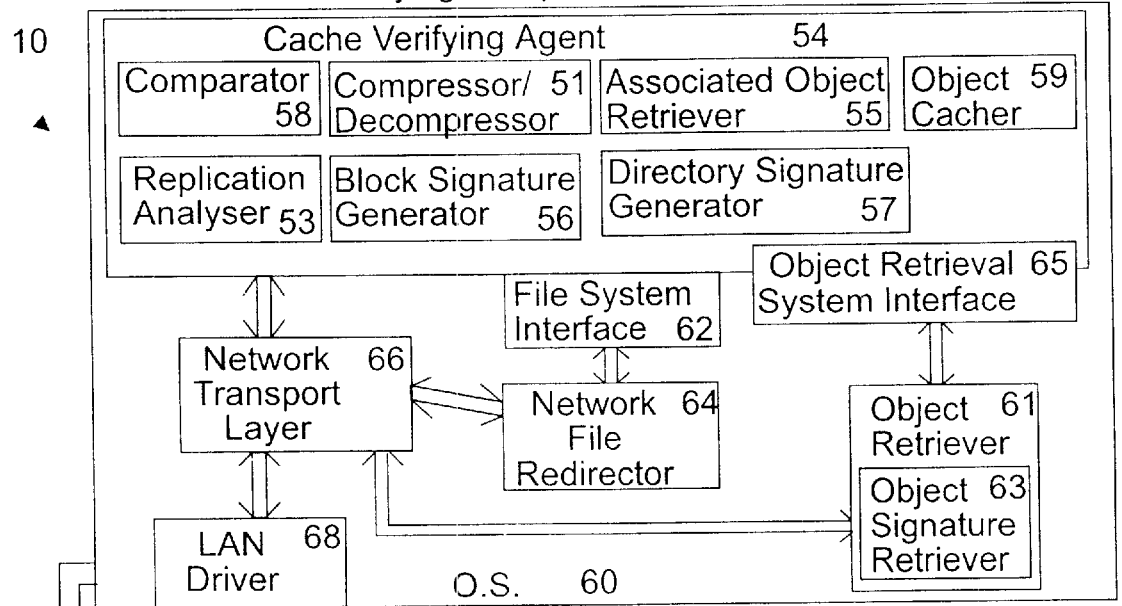
Figure 2:
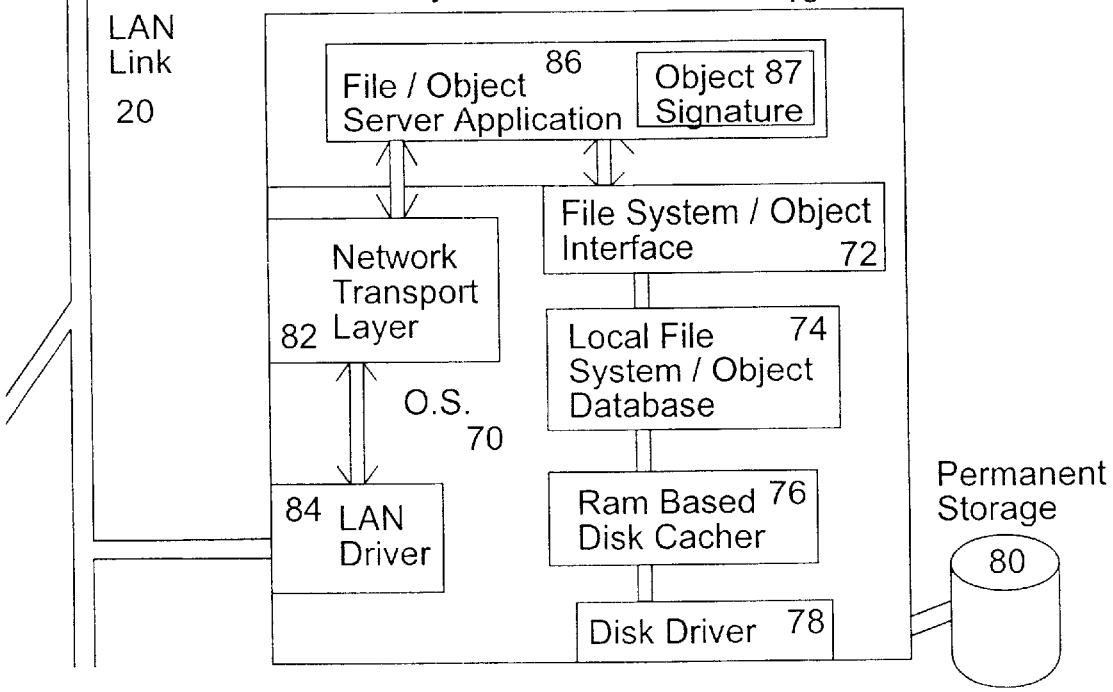
Figure 2A:
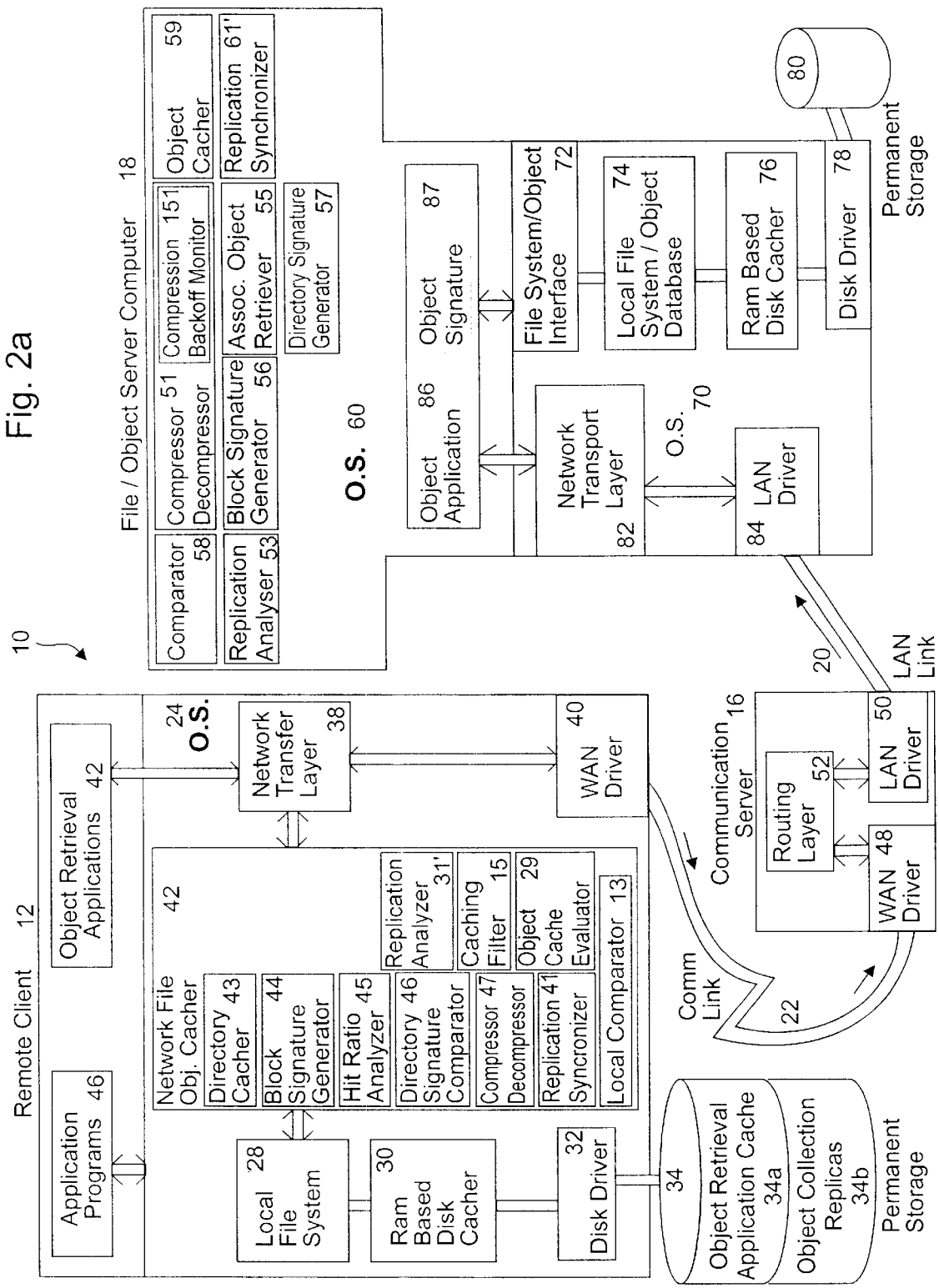
FIG. 2a illustrates a block diagram configuration of another embodiment of the invention wherein the intelligence of the cache verifying computer is resident on the object server computer and the intelligence of the network/file object cacher is resident in the object requester application.
Figure 3:
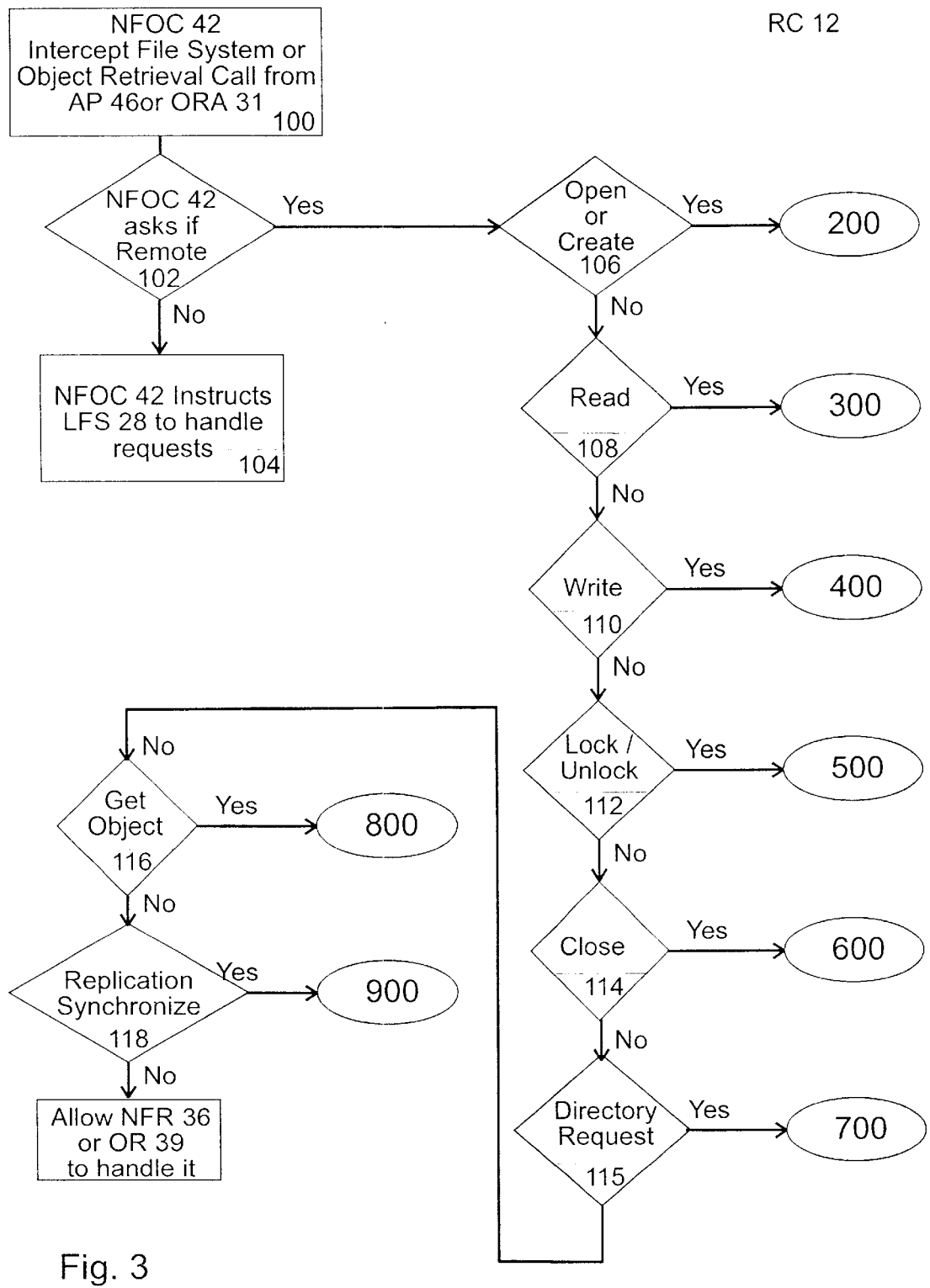
FIG. 3 illustrates a flow chart of the operations of the present invention corresponding to the requests within a remote client.
Figure 4:
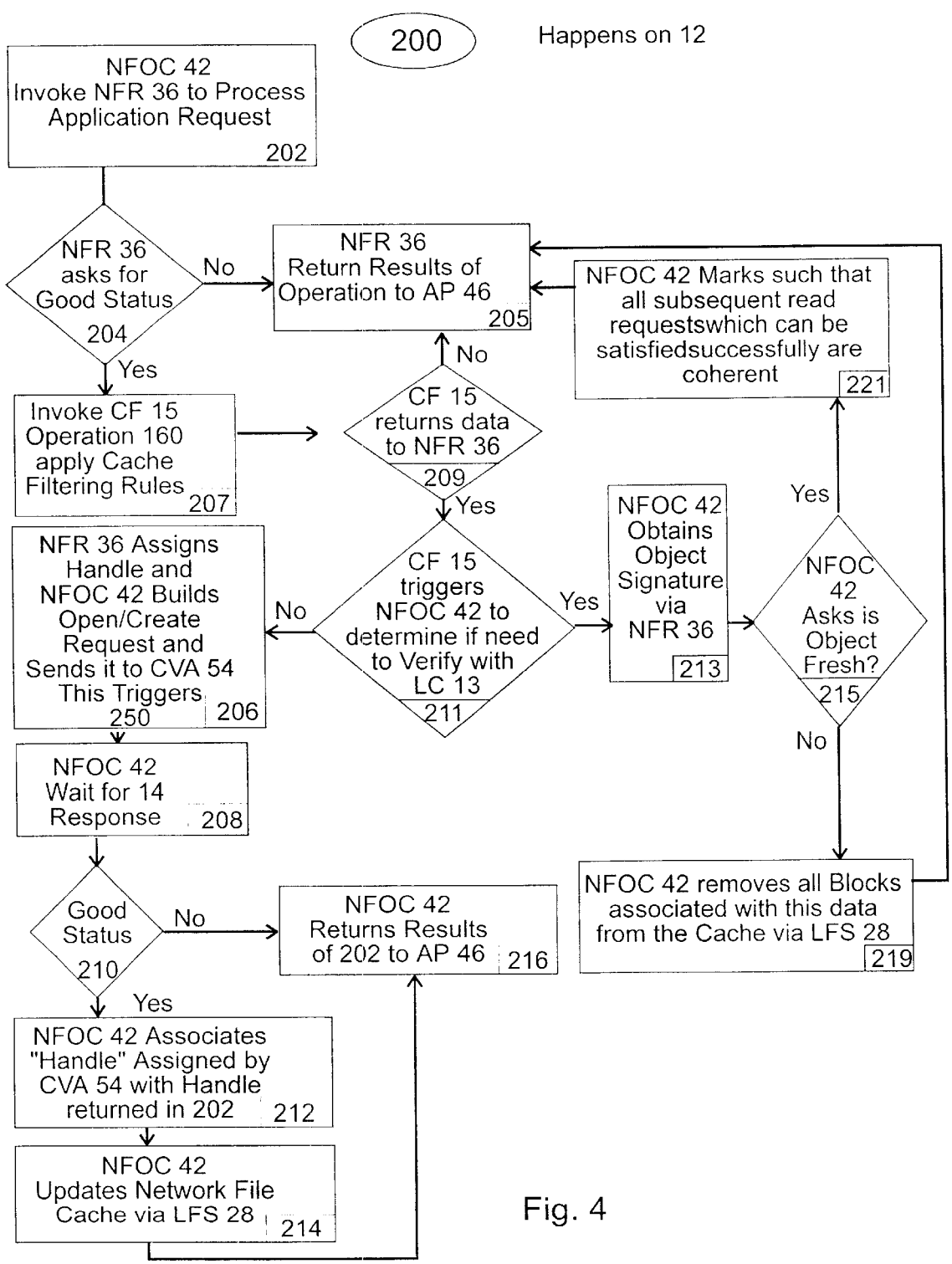
FIG. 4 illustrates a flow chart of the operations of the present invention corresponding to OPEN/CREATE requests on remote client computer.
Figure 4A:
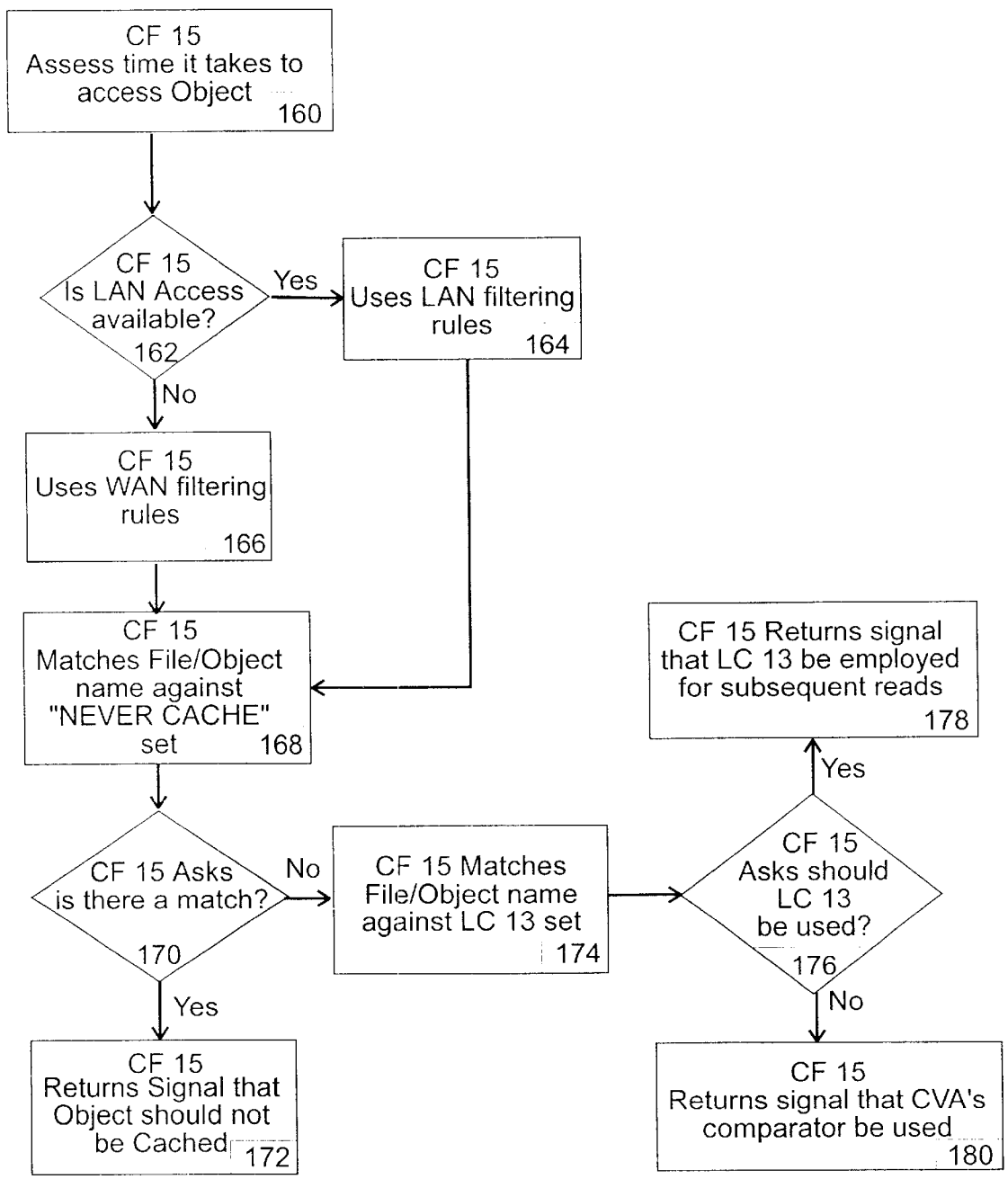
FIG. 4a illustrates a flow chart of the operations of the present invention corresponding to a part of the operations in FIG. 4.
Figure 5:
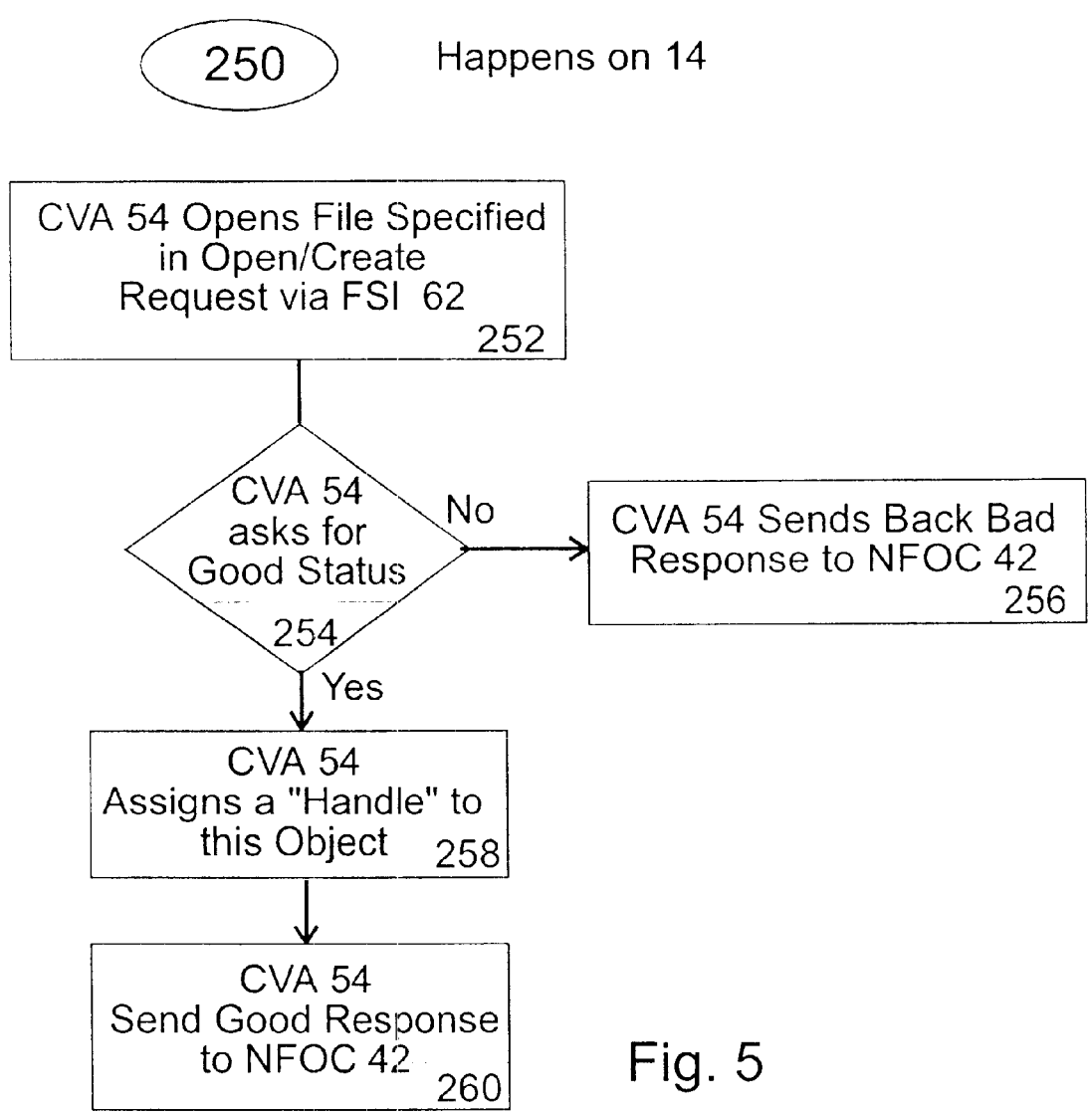
FIG. 5 illustrates a flow chart of the operations of the present invention corresponding to OPEN/CREATE requests on cache verifying computer.
Figure 6:
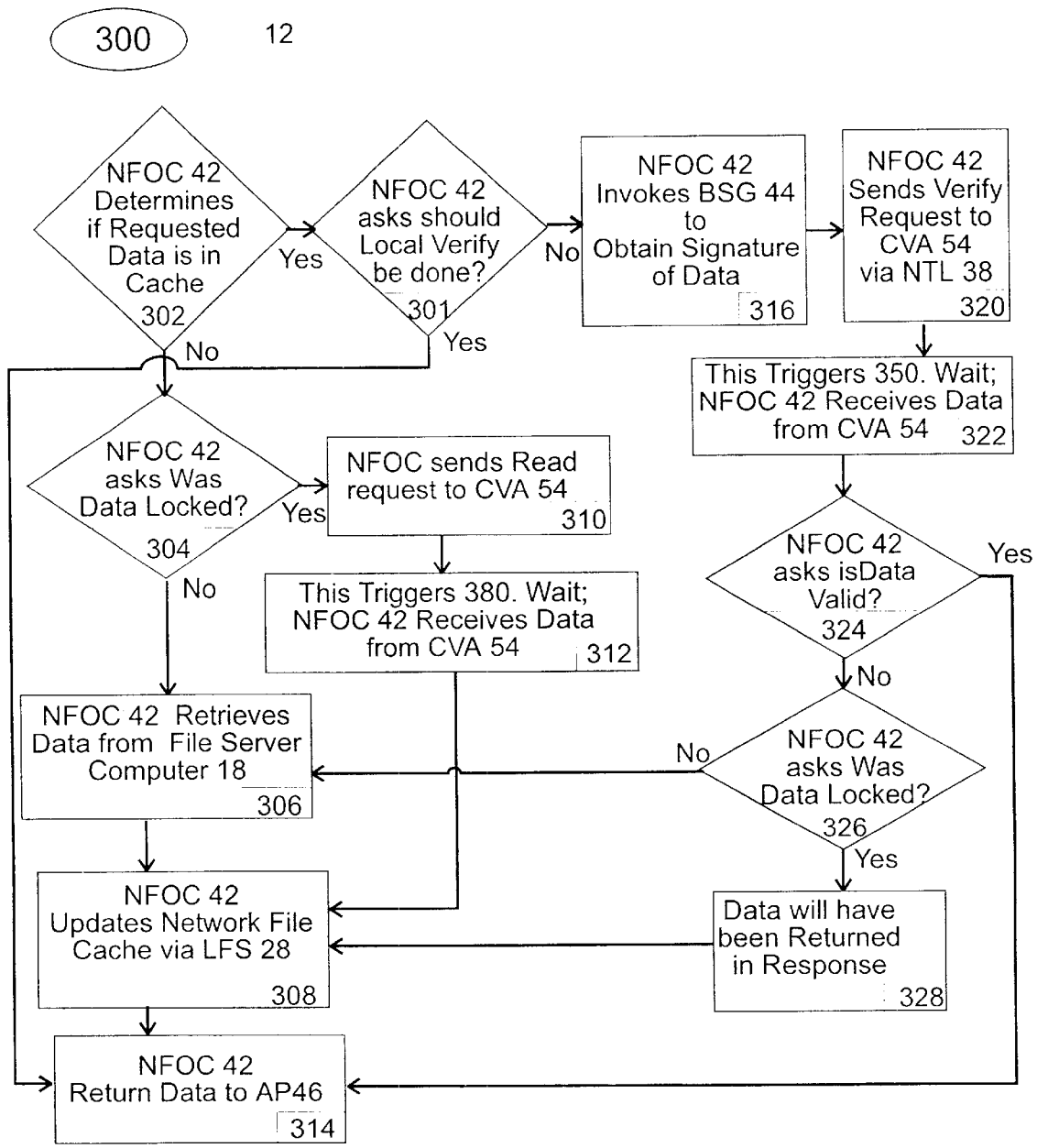
FIG. 6 illustrates a flow chart of the operations of the present invention corresponding to READ requests on remote client computer.
Figure 7:
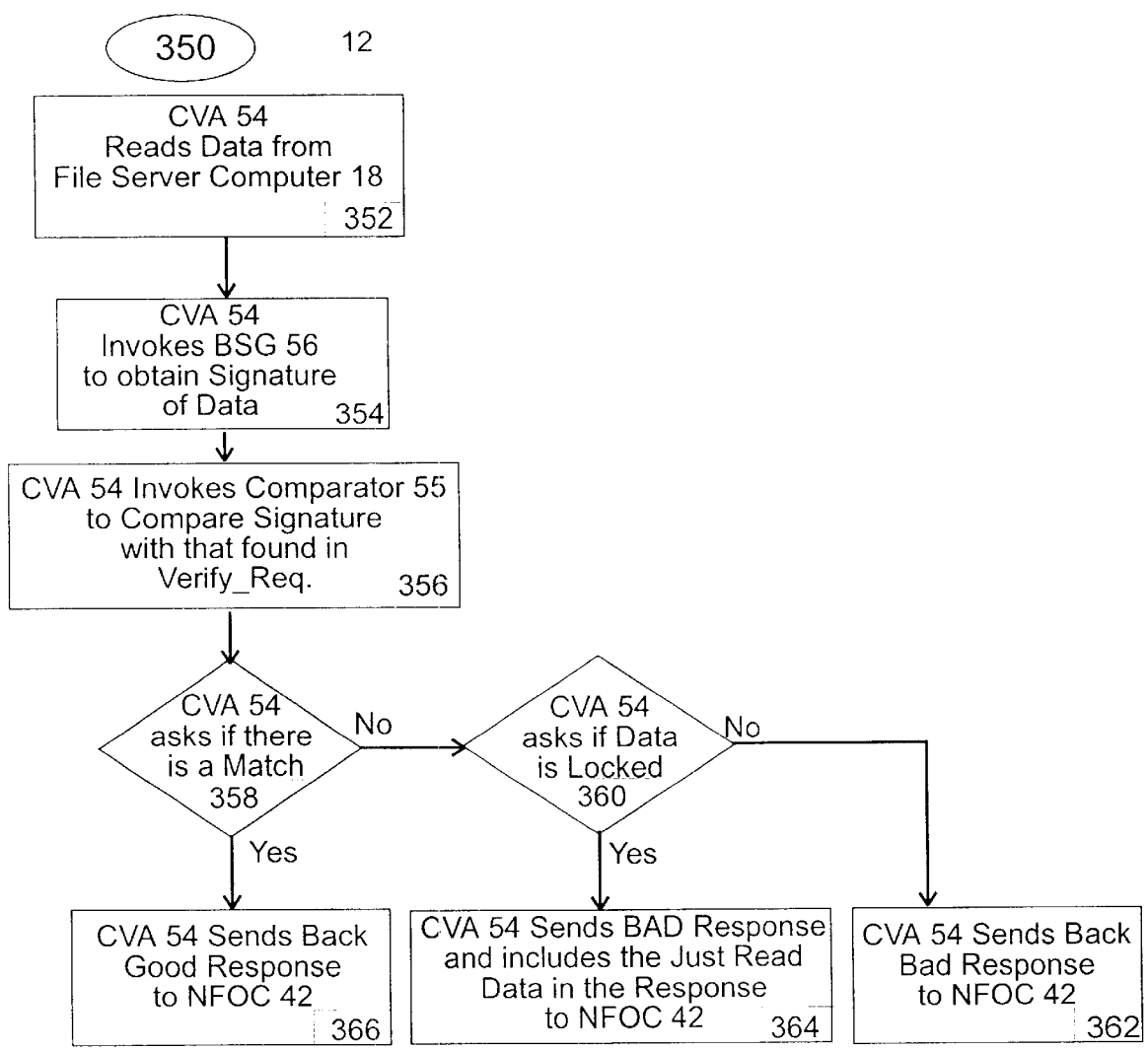
FIG. 7 illustrates a flow chart of the operations of the present invention corresponding to READ requests on cache verifying computer.
Figure 8:
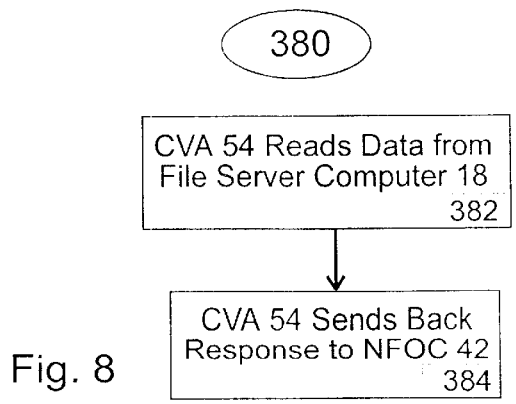
FIG. 8 illustrates a flow chart of additional operations of the present invention corresponding to READ requests in the cache verifying computer.
Figure 9:
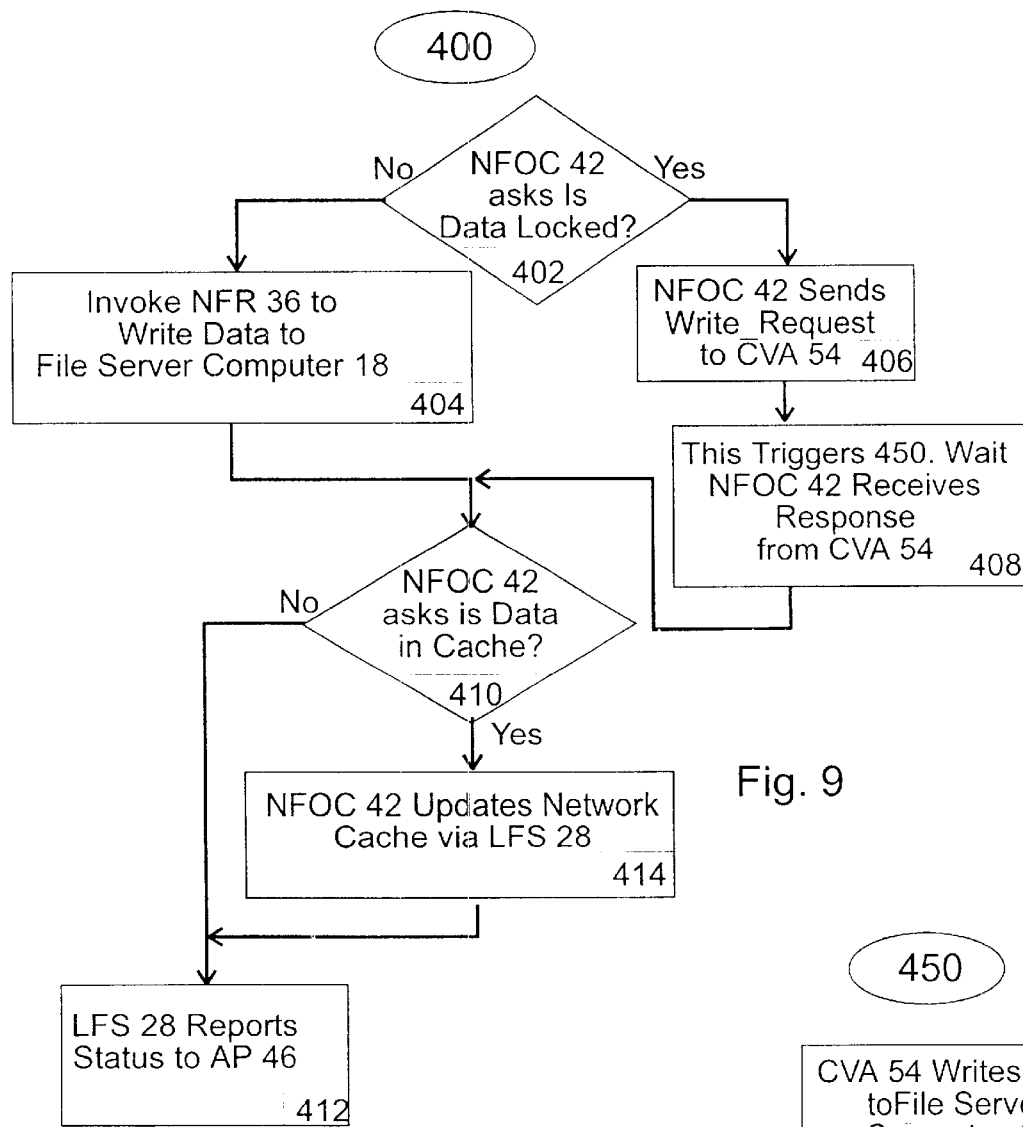
FIG. 9 illustrates a flow chart of the operations of the present invention corresponding to WRITE requests on remote client computer.
Figure 10:
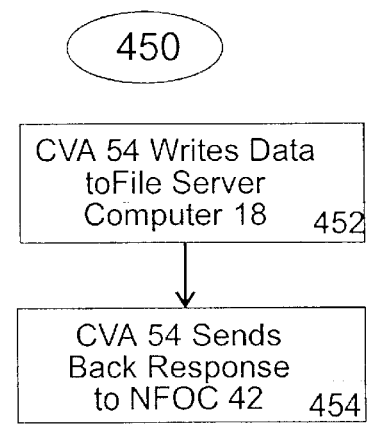
FIG. 10 illustrates a flow chart of the operations of the present invention corresponding to WRITE requests on cache verifying computer.
Figures 11, 12:
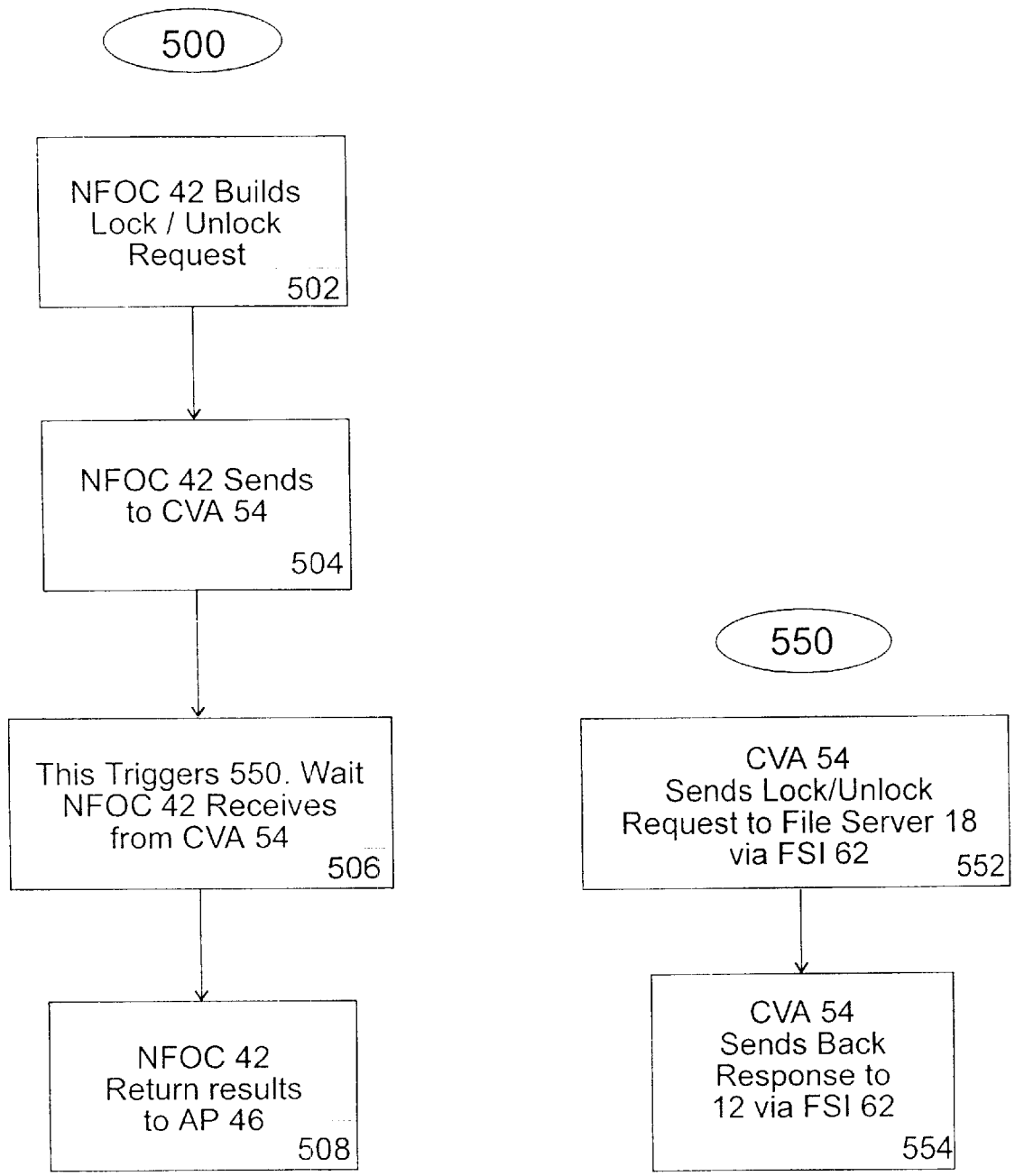
FIG. 11 illustrates a flow chart of the operations of the present invention corresponding to LOCK requests on remote client computer.
FIG. 12 illustrates a flow chart of the operations of the present invention corresponding to LOCK requests on cache verifying computer.
Figures 13, 14:
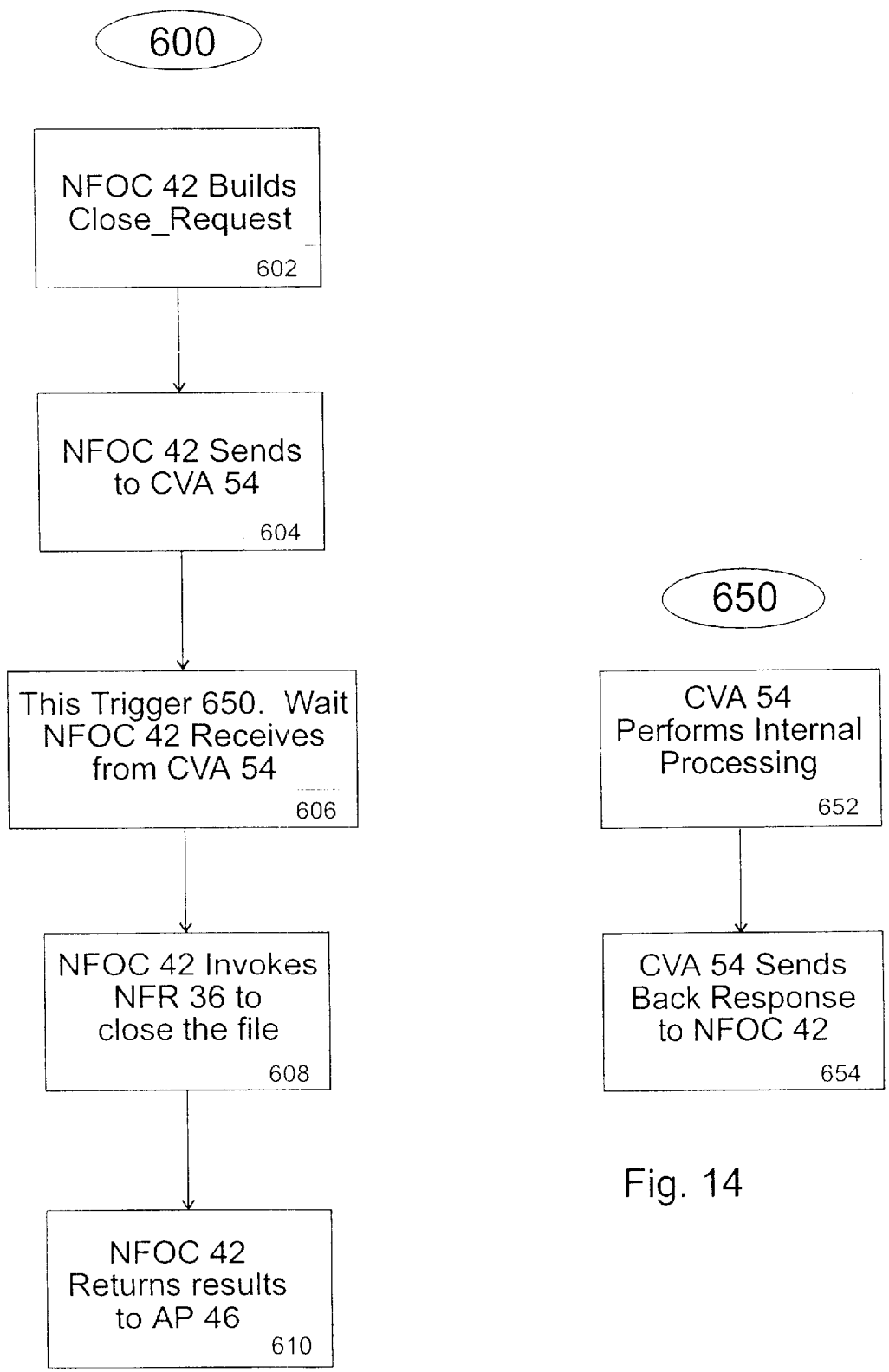
FIG. 13 illustrates a flow chart of the operations of the present invention corresponding to CLOSE requests on remote client computer.
FIG. 14 illustrates a flow chart of the operations of the present invention corresponding to CLOSE requests on cache verifying computer.
Figure 15:
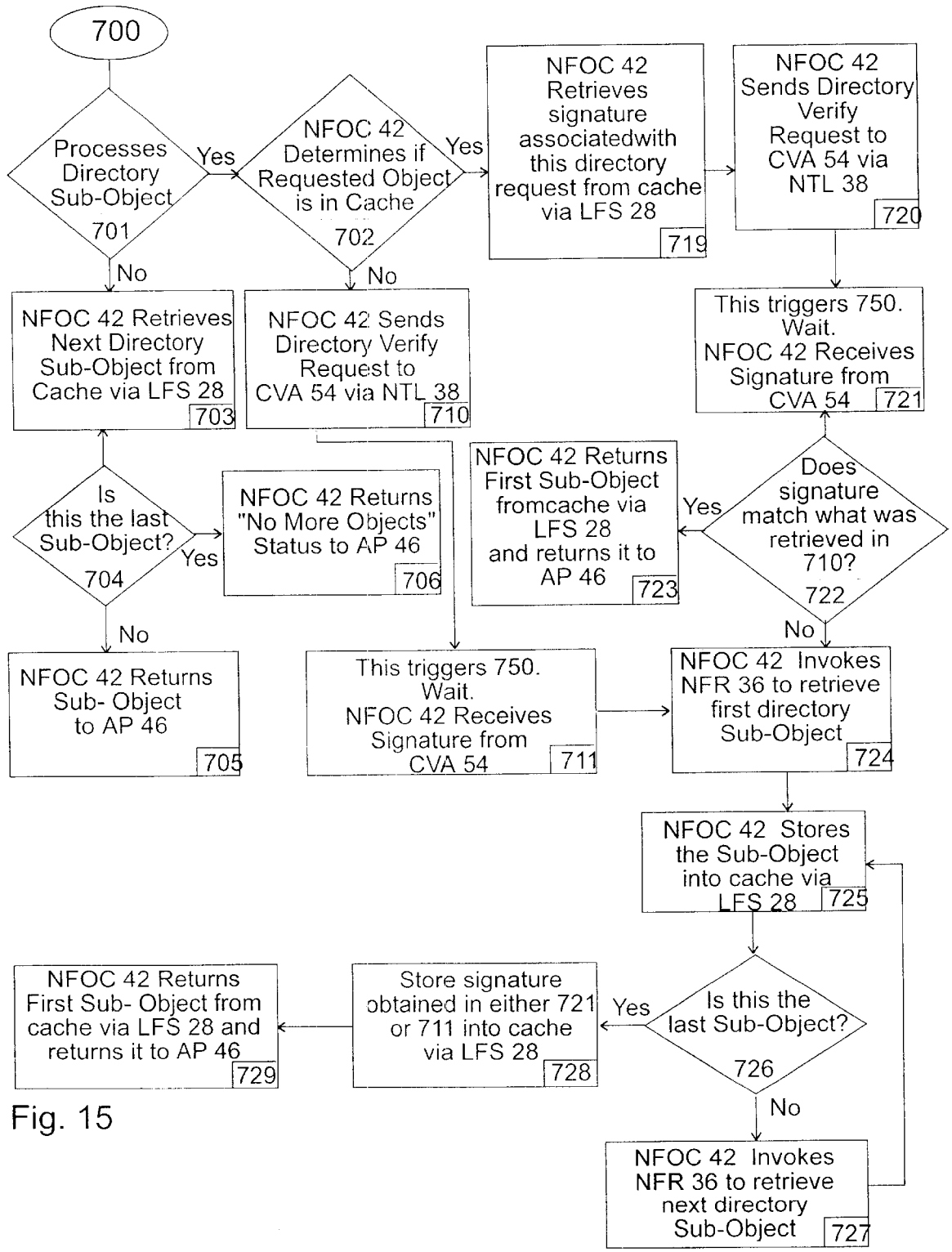
FIG. 15 illustrates a flow chart of the operations of the present invention corresponding to DIRECTORY REQUEST on cache verifying computer.

While it is shown that these functional groups are in the CVA, it is contemplated that these functions can be embedded into the file object server. Likewise the function of the NFOC could be embedded into the ORA. This is shown in FIG. 2A. It is important that the techniques described herein be applied only when it would benefit the efficiency of the overall system. The most important consideration in this application is the speed of the communication link between the remote client computer 12 and the tile/object server computer 18. For example applying data compression to an object prior to transmission should only be done if the reduction of characters transmission from that compression function results in improved response time to the remote client 12; on a fast link, the CPU cycles required to perform the compression may actually slow down the overall responsiveness of the system and therefore data compression should not be applied in this scenario. As will be more apparent in FIG. 23 described hereinafter, the compression device employed herein monitors the processor usage to determine whether to disable/enable compression of data/objects.

Also, included is an OS 60 having an FSI 62 operatively connected to CVA 54, an NFR 64 operatively connected to the FSI 62, an NTL 66 operatively connected to the NFR 64 and CVA 54, and a LAN driver 68 operatively connected to the NTL 66. The CVA 54 is also operatively connected to an ORSI 65 which is in turn operatively connected to an OR 61 and in turn to OSR 63. The OR 61 is operatively connected to the NTL 66.

The file/object server computer 18 includes an OS 70 having a file system/object interface (FSOI) 72 which is operatively connected to a local file system/object database (LFOS) 74 which in turn is connected to an RBDC 76, a DD 78 and a PSD 80. The OS 70 includes an NTL 82 operatively connected to a LAN driver 84. A file/object server application (FOSA) 86 exists on the computer 18 which is operably connected to both the NTL 82 and FSI 72. The FOSA 86 includes operatively associated therewith an object signature (ObS) 87.

It should be noted that one skilled in the art can modify the basic network computer to accomplish the objects set forth herein and that such modifications are believed to fall within the scope of the claims appended hereto. Alternatively, for example, the cache verifying agent 54 could reside as part of the communication server 16 or as a stand alone processor with its own memory and operating system. Still, other persons skilled in the art will appreciate the verifying agent can be implemented in other manners to accomplish the goals set forth herein.

The operation of the system is as follows and as represented in FIGS. 3–22. The operations discussed hereafter assumes connections have been made among all computers 12, 14 and 18 and communication server 16.

On the remote client computer 12. AP 46 makes requests from a file/object server computer 18 wherein the NFOC 42 will intercept a file system call or object retrieval call 100 from the AP 46 or ORA 31 and query whether the data to be acted upon is "remotely located?" 102. If the answer is no, the NFC 42 "instructs" 104 the LFS 28 to handle the data request. If yes, the type of request is ascertained and handled as follows.

In the case of OPEN or CREATE 106 requests, the NFOC 42 follows the operation under 200. The NFOC 42 "invokes" 202 the NFR 36 to process the request. The NFR 36 asks "whether there is a good status" 204 for the request. If no, NFR 36 "returns" 205 the results of the operation to the respective AP 46 or ORA 31.

If yes, NFOC 42 "invokes" 207 CF 15 to "ask" if the data, e.g., objects associated with a file, should be cached based on a set of pre-defined filtering rules and goes to operation 160. CF 15 "assesses" 160 how much time it takes to access data, e.g., an object. CF 15 "determines" 162 "is LAN access available?" If yes, CF 15 "applies" 164 LAN filtering rules. If no, CF 15 "uses" 166 "WAN filtering rules?" From operations 164 and 166 follows operation 168 wherein CF 15 "matches" 168 file/object name against "never cache" set. The "never cache" set is a set of data never to be cached. CF 15 "asks" 170 "is there a match?" If yes, CF 15 "returns" 172 a signal that data should not be cached. If no match, CF 15 "matches" 174 file/object name against LC 13 set. CF 15 "asks" 176 "should" LC 13 be used?" If yes, CF 15 "returns" 178 a signal that LC 13 be employed for the subsequent reads and operation 211 follows. If no, CF 15 "returns" 180 a signal that CVA's 54 comparator 58 be used on subsequent reads and CF 15 "returns" 209 the data to NFR 36 at operation 205.

If yes, CF 15 triggers NFOC 42 to examine the characteristics of the open method and "determine" 211 if the objects associated with this file may be verified with a LC 13. If yes, then NFOC 42 "obtains" 213 the signature by employing either the FSR 33 or OSR 35. Then NFOC 42 "asks" 215 is the data fresh? meaning, for example, "are the objects associated with this file coherent based on the FSR 33. If yes, the NFOC 42 "marks" 221 a handle such that all subsequent read requests which can be satisfied from the cache are deemed coherent based on the LC 13. The results are returned to operation 205.

If no, then all blocks associated with this data, e.g., file, are "removed" 219 from the cache by the NFOC 42 via LFS 28 and the NFR 36 returns 205 the results of the operation to AP 46, for this example.

If "no" was the determination of operation 211, the NFR 36 assigns a handle to the data and the NFOC 42 "builds and sends" 206 an OPEN/CREATE request to CVA 54 via NTL 38 which triggers operation 250.

CVA 54 "opens" 252 a file specified in OPEN/CREATE request via FSI 62, NFR 62 and NTL 66. The CVA 54 asks "whether there is a good status on the file?" 254. If the answer is no, CVA 54 "sends" 256 the bad response back to NFOC 42 in a reverse channel. If the answer is yes, CVA 54 "assigns a handle to the object" 258 and "sends" 260 a good response via a reverse channel.

NFOC 42 via NTL 38 "receives the response" 208 from CVA 54 and "asks for a good status?" 210. If the answer is no, the NFOC 42 "returns the results of the original OPEN/CREATE request" 216 to AP 46. If the answer is yes, then the NFOC 42 "associates 212 the handle assigned by the CVA 54 with the handle returned by the NFR 36 in operation 202. The NFOC 42 "updates" 214 the network file cache via LFS 28 and "returns the results obtained by NFR 36" 216 to AP 46 via FSI 26.

In the case of a READ 108 request, the computer 12 follows the operation 300. Via the FSI 26 and LFS 28, the NFOC 42 "determines if the requested data is in cache?" 302. If the answer is no, a subquery becomes "is the data locked?" 304. To this subquery, if the answer is no, the NFOC 42 "retrieves" 306 the data via NTL 38 from the file/object server computer 18 and the NFOC 42 "updates" 308 the network file cache via LFS 28. If the answer to the subquery is yes, the NFOC 42 via the NTL 38 "sends" 310 a READ request to CVA 54 which triggers 380. CVA 54 via the FSI 62 "reads" 382 the data from the file server computer 18. The CVA 54 "sends" 384 a response back to NFOC 42, wherein the data is "received" 312 and "updated" 308 as described above. The retrieved data is "returned" 314 by the NFOC 42 to AP 46.

If the data is in cache, NFOC 42 "asks" 301 should the verify be done using the LC 13. The answer to this was established based on whether or not 221 had been invoked during the OPEN operation. If the answer is yes, then NFOC 42 "invokes" 213 LC 13.

If the answer is no, NFOC 42 is triggered to "invoke" 316 the BSG 44 to generate a signature of data. NFOC 42 via NFR 36 and NTL 38 "sends" 320 a VERIFY request having the first signature of data therein to CVA 54 which triggers 350.

CVA 54 via FSI 62 "reads" 352 data from the file server computer 18. CVA 54 "invokes" 354 BSG 56 to generate a second signature of data. CVA 54 "invokes" 356 comparator 58 to compare the first and second signatures of data and "asks whether there is a match?" 358. If the answer is no, CVA 54 "asks if data is locked?." 360. If no, the CVA 54 "sends" 362 back a bad response to NFOC 42 via a reverse channel. If yes, CVA 54 "sends"364 back a bad response to NFOC 42 along with read data via a reverse channel. If there is a match of the signatures, CVA 54 "sends" 366 a good response back to NFOC 42 via NTL 66.

The NFOC 42 receives 322 the response from CVA 54 and asks "is the data valid?" 324. If no, NFOC 42 asks "is the data locked?" 326. If not locked, the NFOC 42 retrieves data 306 as described above. If locked, data will have been "returned" 328 for updating( per 308. If the data was valid, NFOC 42 returns the data to AP 46.

In the case of a WRITE 110 request, the computer 12 follows the operation 400. The NFOC 42 "asks is the data locked?" 402. If no, the NFR 36 is invoked to "write" 404 to the file server computer 18. If the data is locked, NFOC 42 via NTL 38 "sends" 406 a WRITE request to CVA 54 which triggers 450. CVA 54 "writes" 452 data to file server computer 18 via FSI 62. CVA 54 "sends" 454 back a response to NFOC 42 which "receives" 408 the response. The NFOC 42 "asks is the data in cache?" 410. If no, LFS 28 "reports status" 412 to AP 46. If yes, NFOC 42 "updates" 414 network cache via LFS 28 and "reports status" 412 to AP 46.

In the case of LOCK/UNLOCK 112 request, operation 500 is employed. The NFOC 42 "builds" 502 an LOCK/UNLOCK request. The NFOC 42 via NTL 38 "sends" 504 the LOCK/UNLOCK request to CVA 54 which triggers operation 550. CVA 54 "sends" 552 an LOCK/UNLOCK request to the file server computer 18 via FSI 62. CVA 54 "sends" 554 a response back to NFOC 42 via a reverse channel. The NFOC 42 "receives" 506 the response and "returns" 508 the results to AP 46.

In the case of a CLOSE 114 request, operation 600 is employed. The NFOC 42 "builds" 602 a CLOSE request. The NFOC 42 via NTL 38 "sends" 604 the CLOSE request to CVA 54 which triggers operation 650. CVA 54 "performs's" 652 internal processing of the request. CVA 54

"sends" 654 a response back to NFOC 42. The NFOC 42 "receives" 606 the response and invokes the NFR 36 to "close" 608 the file and "return" 610 the results to AP 46.

In the case of a DIRECTORY REQUEST 115, operation 700 is employed. Here, the NFOC 42 "processes" 701 a first directory sub-object request.

If the sub-object is not a first, NFOC 42 "retrieves" 703 the next directory sub-object from cache via LFS 28. NFOC 42 "asks" 704 whether this is the last sub-object from cache via LFS 28? If no, NFC "returns" 705 a sub-object to AP 46. If yes and it is the last sub-object, NFOC 42 "returns" 706 a "no more objects" status to AP 46.

Figure 16:
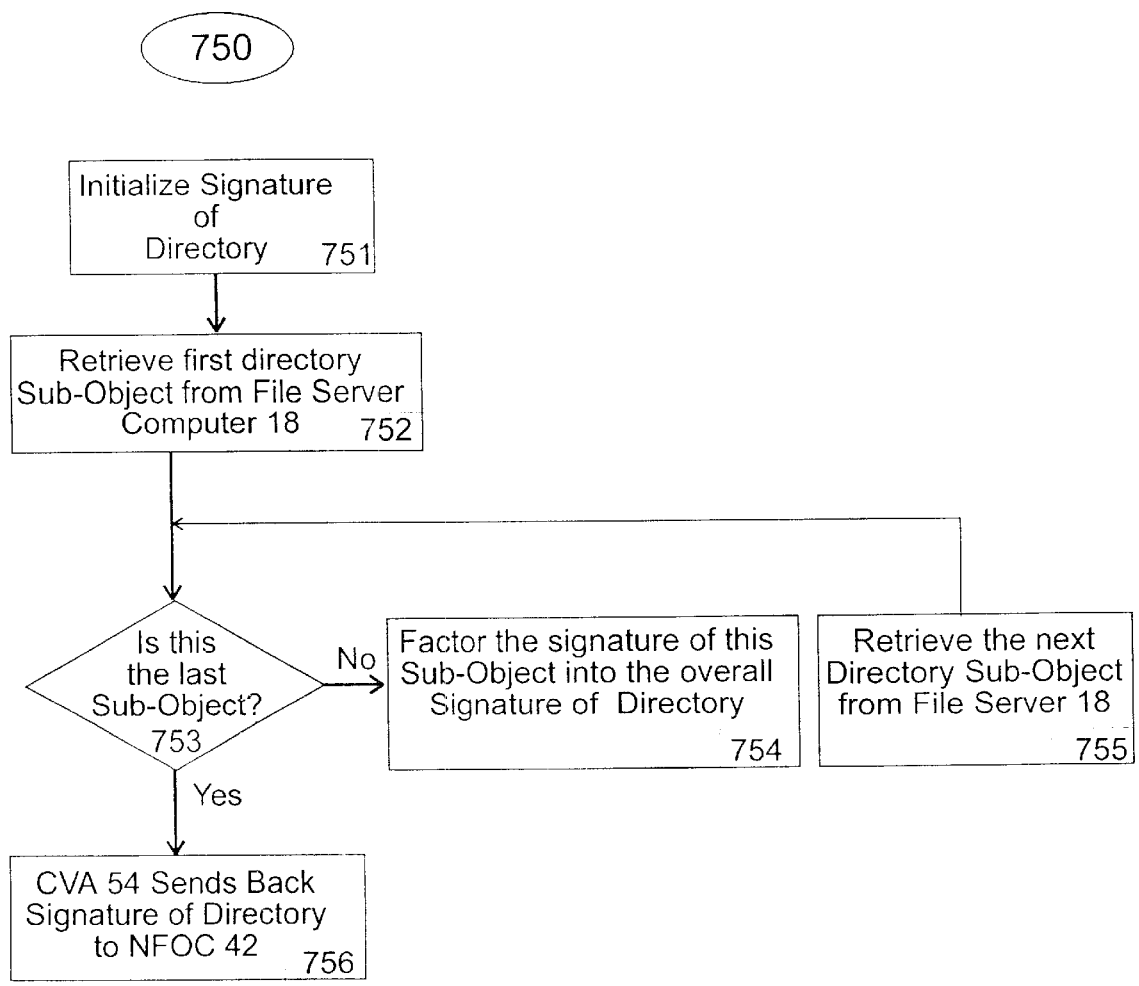
FIG. 16 illustrates a flow chart of the operations of the present invention corresponding to a part of the operations in FIG. 15.
Figure 17:
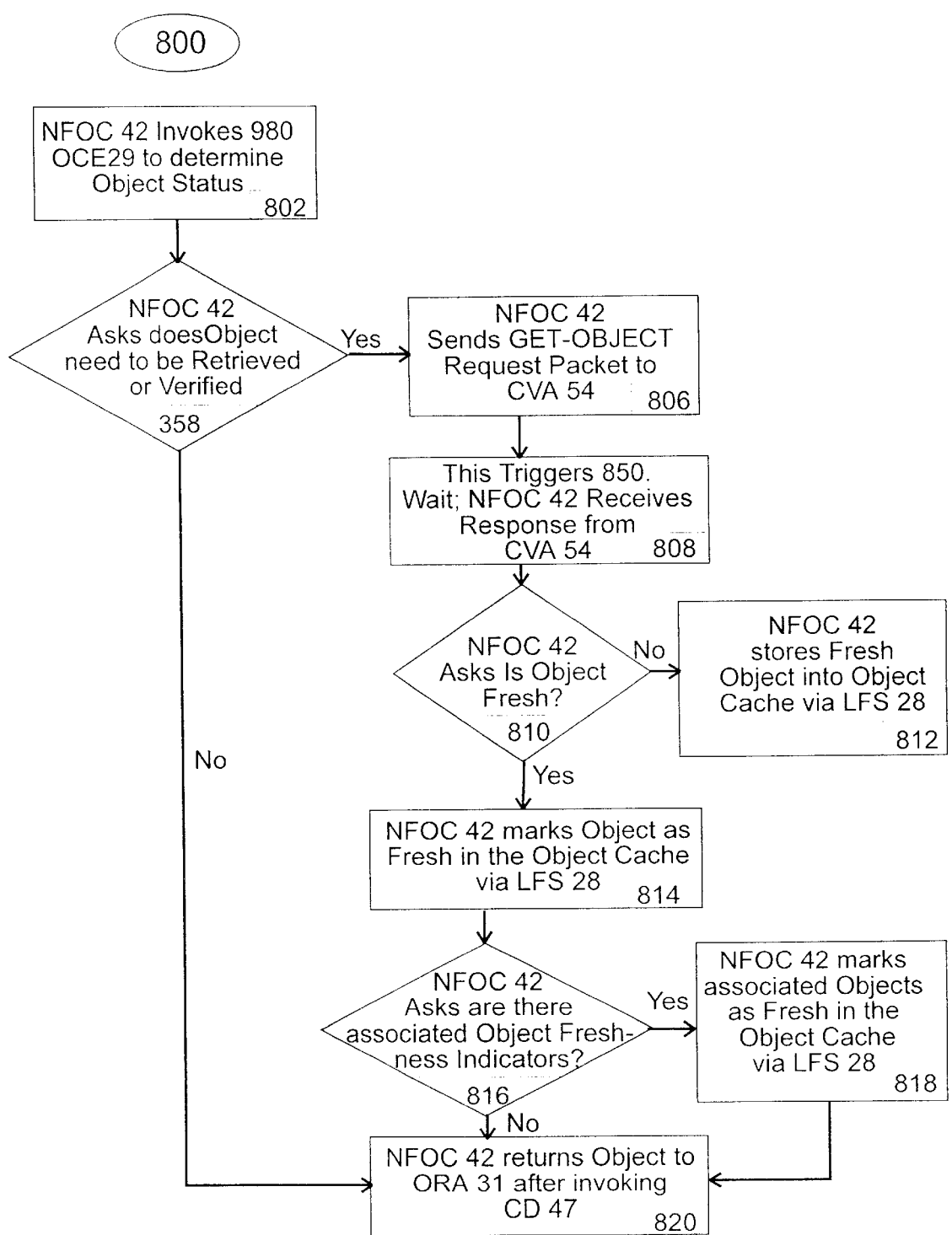
FIG. 17 illustrates a flow chart of the operations of the present invention corresponding to GET-OBJECT REQUEST on the remote client computer.
Figure 18:
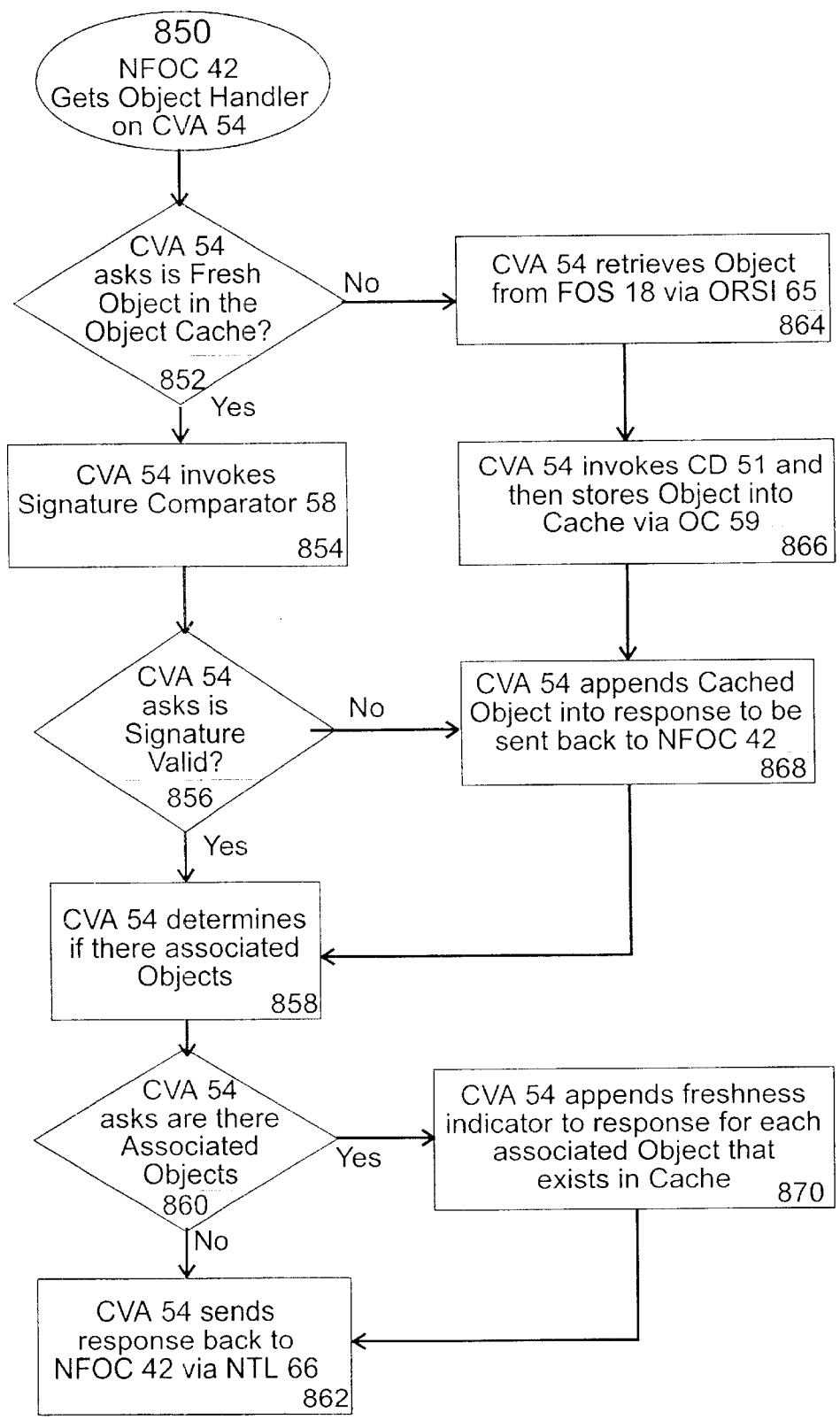
FIG. 18 illustrates a flow chart of the operations of the present invention corresponding to GET-OBJECT REQUEST on the cache verifying computer.
Figure 19:
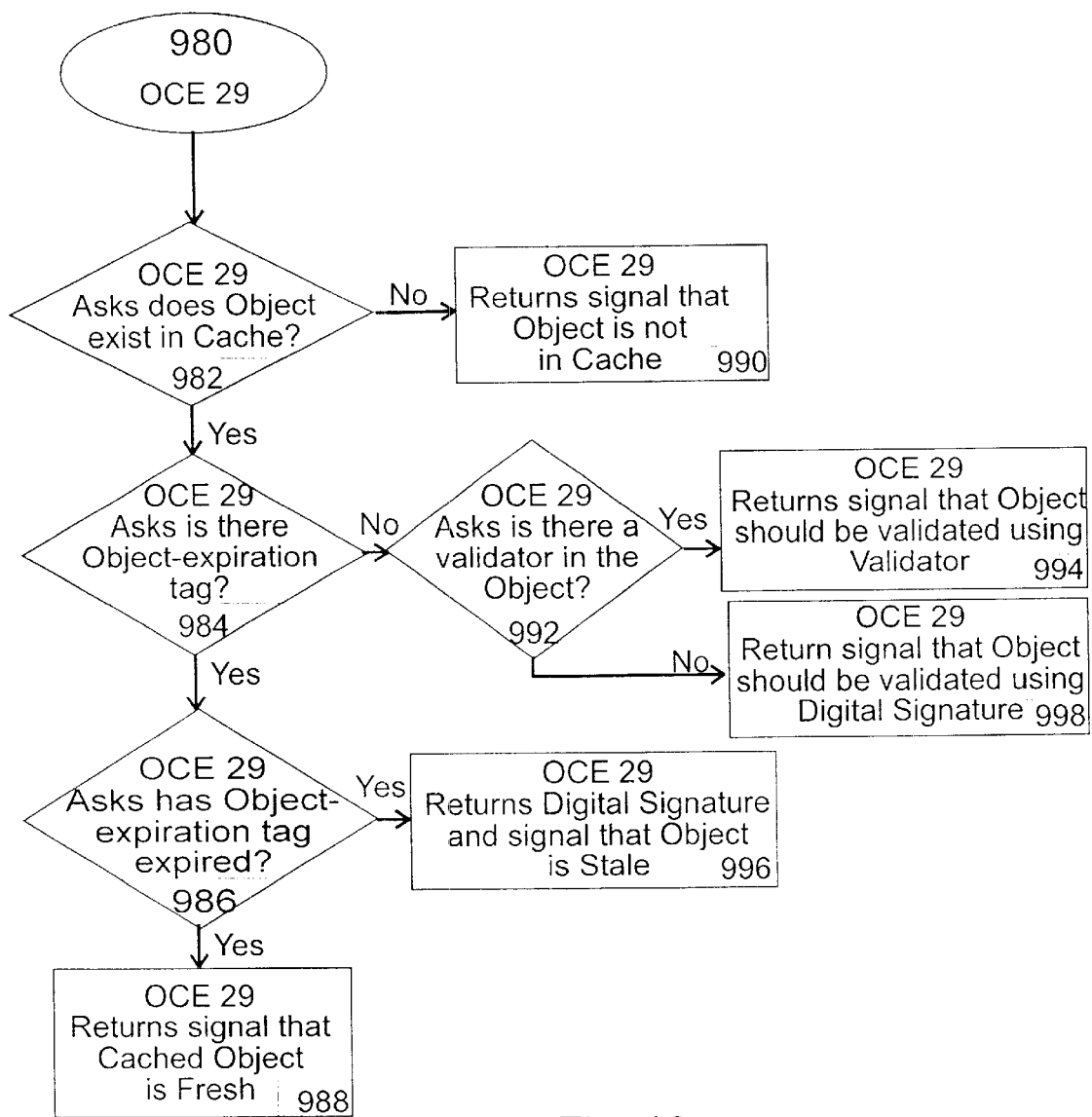
FIG. 19 illustrates a flow chart of the operations of the present invention corresponding to a object cache evaluator.
Figure 20:
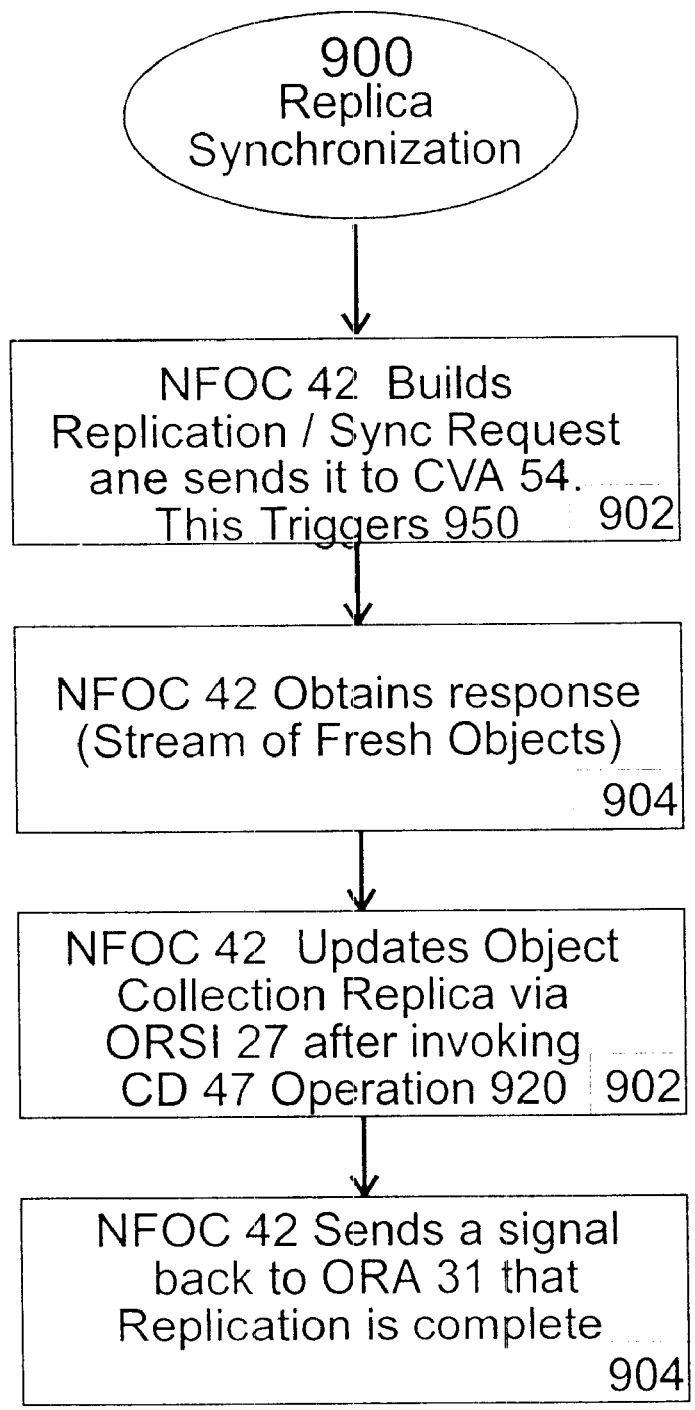
FIG. 20 illustrates a flow chart of the operations of the present invention corresponding to a REPLICATE-SYNCHRONIZATION request on the remote client computer.
Figure 21:
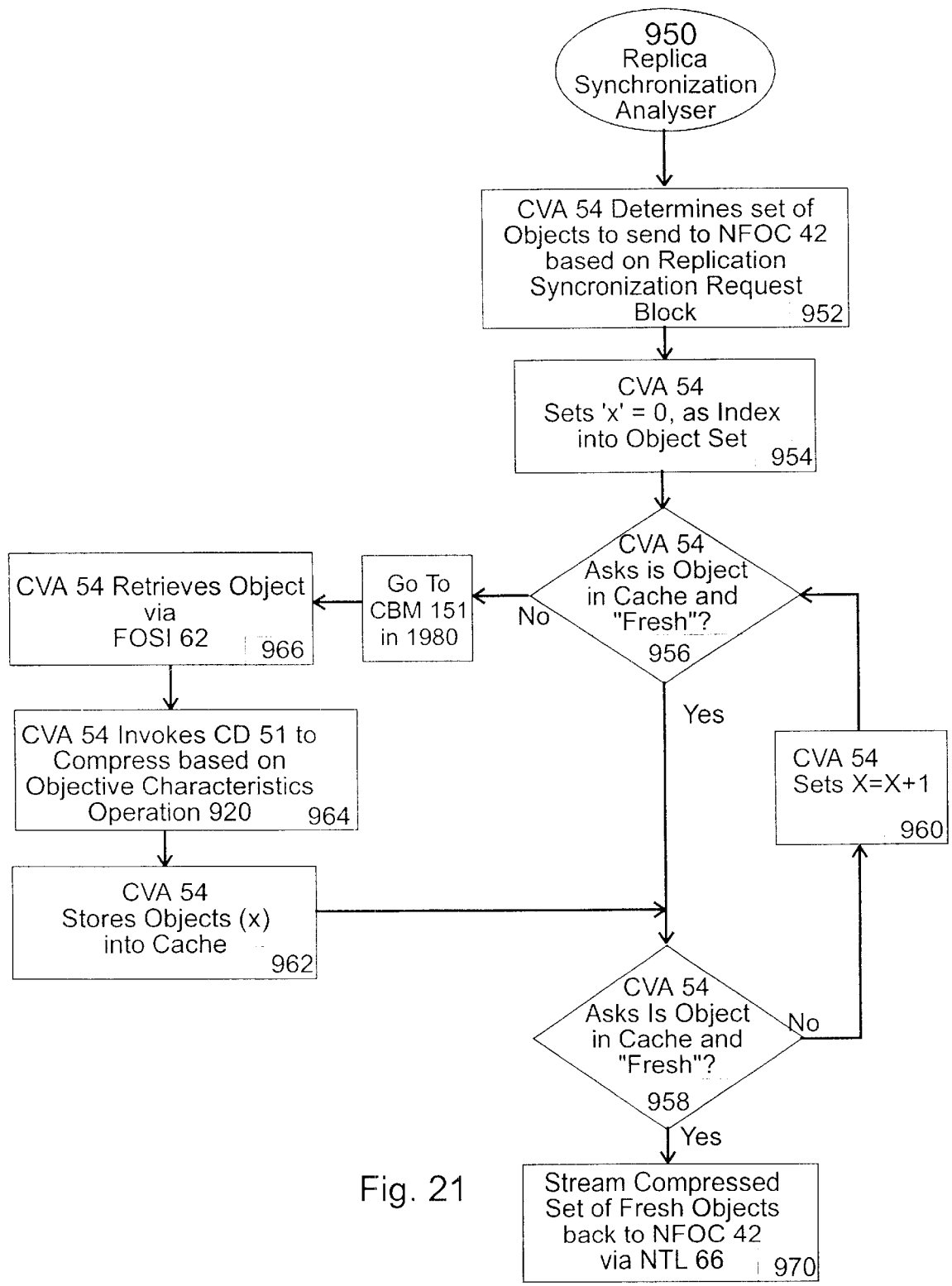
FIG. 21 illustrates a flow chart of the operations of the present invention Corresponding to a REPLICATE-SYNCHRONIZATION request on the cache verifying computer.
Figure 22:
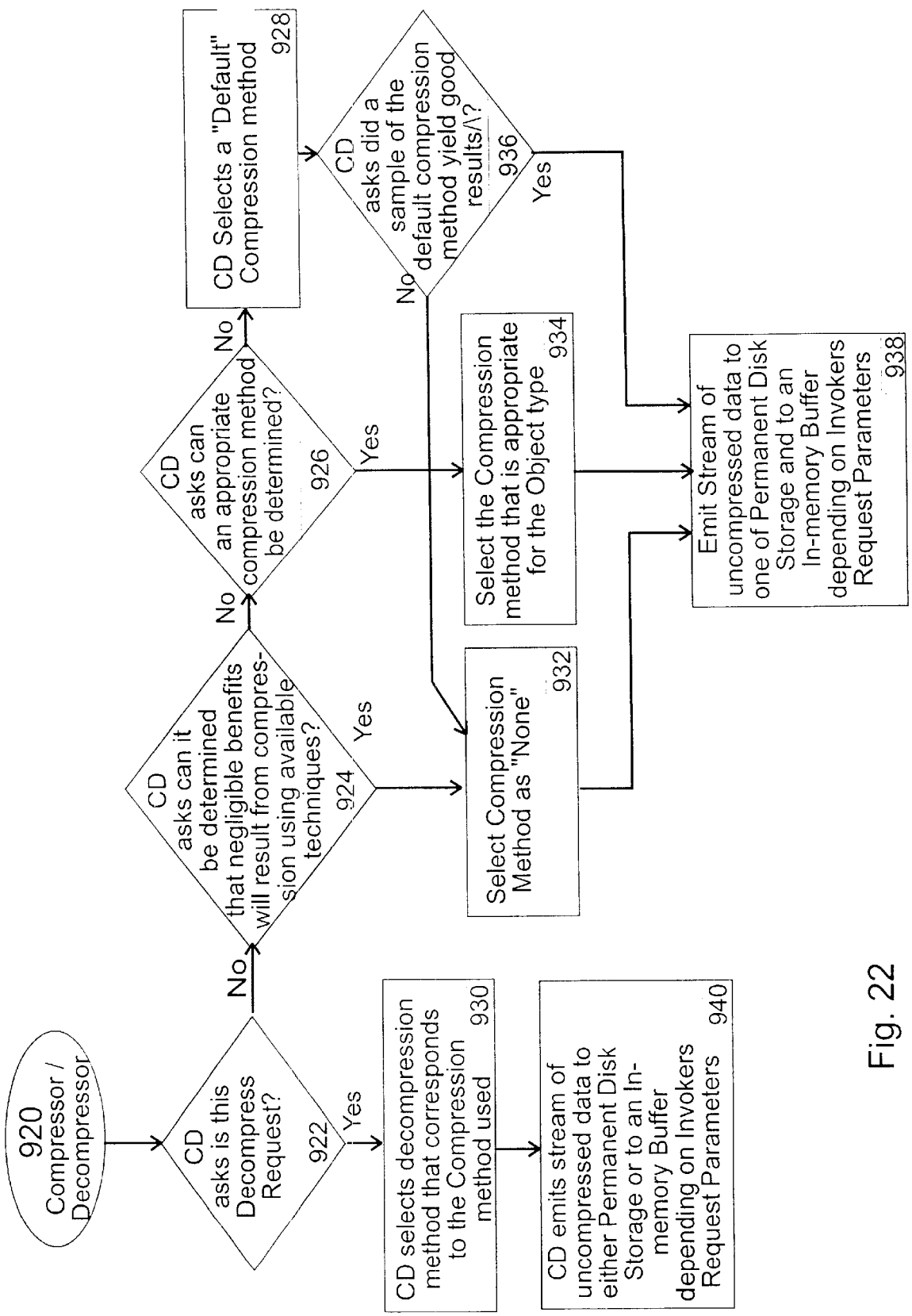
FIG. 22 illustrates a flow chart of the operations of the present invention corresponding to a compression/decompression unit.

If the sub-object is the first directory sub-object, the NFOC 42 "determines" if the requested object is in cache 702. If no, the NFOC 42 "sends" 710 a directory verify request to CVA 54 via NTL 38. This triggers the steps 750 and NFOC 42 waits to "receive" 711 signature from CVA 54. As seen in FIG. 16, the steps 750 are preformed by the CVA 54. Particularly, the DSG 57 "initializes" 751 signature of a directory. The DSG 57 "retrieves" 752 the first directory sub-object from the FS 18 via NTL 66. The DSG 57 "asks" 753 is this the last sub-object? If no, DSG 57 "factors" 754 the signature of this sub-object into the overall signature of the directory. The DSG 57 then "retrieves" 755 the next sub-object from FS 18 and returns to step 753. If the last sub-object, CVA 54 "sends" 756 back signature of directory to NFOC 42 at block 724 and proceeds therefrom.

If yes and in cache, the NFOC 42 "retrieves" 719 signature associated with this directory request from cache via LFS 28. NFOC 42 "sends" 720 directory verify request to CVA 54 via NTL 38. This triggers the steps 750 wherein NFOC 42 waits and "receives" 721 signature from CVA 54. NFOC 42 "invokes" 722 DSC 46 to compare whether signature matches the retrieved signature in 719? If yes and the signatures match, NFOC 42 "returns" 723 the first sub-object from cache via LFS 28 and returns it to AP 46. If no and the signature does not match, NFOC 42 "invokes" 724 NFR 36 to retrieve the first directory sub-object. NFOC 42 "stores" 725 the sub-object into cache via LFS 28. NFOC 42 "asks" 726 whether this is the last sub-object? It no and it is not the last sub-object, NFOC 42 invokes NFR 36 to "retrieve" the next directory sub-object and returns to step 725. If yes and it is the last sub-object, NFOC 42 "stores" 728 the signature obtained via 721 or 711 into cache via LFS 28. NFOC 42 "returns" 729 first sub-object from cache via LFS 28 and returns the same to AP 46.

In the case of a GET-OBJECT REQUEST 116 operation 800 is employed. The NFOC 42 invokes OCE 29 to perform operation 980 to determine object status. OCE 29 "asks" 982 "does object exist in cache? If no, OCE 29 "returns" 990 a signal that object is not in cache. If yes, OCE 29 "asks" 984 "is there an object expiration tag?"

If yes and there is a object expiration tag, OCE 29 "asks" 986 "has object expiration tag expired?" If yes, OCE "returns" 996 a digital signature and signal that object is stale. If no, OCE 29 "returns" 988 signal that cached object is fresh.

If no and there is a object expiration tag, OCE 29 "asks" 992 "is there a validator in the object?" If yes, OCE 29 "returns" 994 a signal that object should be validated using validator. If no, OCE 29 "returns" 998 a signal that object should be validated using digital signature.

Once object status has been determined via 802, NFOC 42 "asks" 358 "does object need to be retrieved or verified?" If yes, NFOC 42 "sends" 806 a Get-Object request packet to CVA 54. This triggers operation 850 and NFOC 42 waits for response from CVA 54.

The operations 850 et seq. are as follows. NFOC 42 "gets" 850 an object handler on CVA 54. CVA 54 "asks" 852 is there a fresh object in the object cache? If yes, CVA 54 "invokes" 854 signature comparator 58. CVA 54 "asks" 856 is the signature valid? If yes, CVA 54 "determines" 858 if there are associated objects. If no, CVA 54 "appends" 868 the cached object into a signal response to be sent back to NFOC 42 and then returns to the operations 858 and those following.

If the answer to operation 852 is no, the CVA 54 "retrieves" 864 an object from FOS 18 via ORSl 65. CVA 54 "invokes" 866 CD 51 and then stores the object into cache via OC 59 and goes to operations 868 and those which follow.

From operation 858, CVA 54 "asks" 860 are there associated objects? If yes, CVA "appends" 870 freshness indicator to a response signal for each associated object that exists in cache. CVA 54 then "sends" 862 a response signal back to NFOC 42 via NTL. 66. If the answer to operation 860 was no, the operation 862 follows.

NFOC 42 "asks" 810 "is the object fresh?" If no, NFOC 42 "stores" 812 fresh object into object cache via LFS 28. If yes, NFOC 42 "asks" 816 "are there associated object freshness indicators?" If yes, NFOC 42 "marks" 818 associated objects as fresh in the object cache via LFS 28. If no, NFOC 42 invokes CD 47 and "returns" 820 the object to ORA 31. If the answer to operation 358 is no, the NFOC 42 invokes CD 47 and "returns" 820 the object to ORA 31.

In the case of a REPLICATION-SYNCHRONIZE REQUEST operation 900 is employed. NFOC 42 "builds" 902 a Replication-Synchronize request and "sends" the request to CVA 54 which triggers operation 950.

CVA 54 "determines" 952 a set of objects to send to NFOC 42 based upon the Replication-Synchronize request. CVA 54 "sets" 954 "x" =0 as index into an object set. CVA 54 "asks" 956 "is the object in cache and fresh?" If no, CVA 54 "retrieves" 966 the object via FOSI 62.

Figure 23:
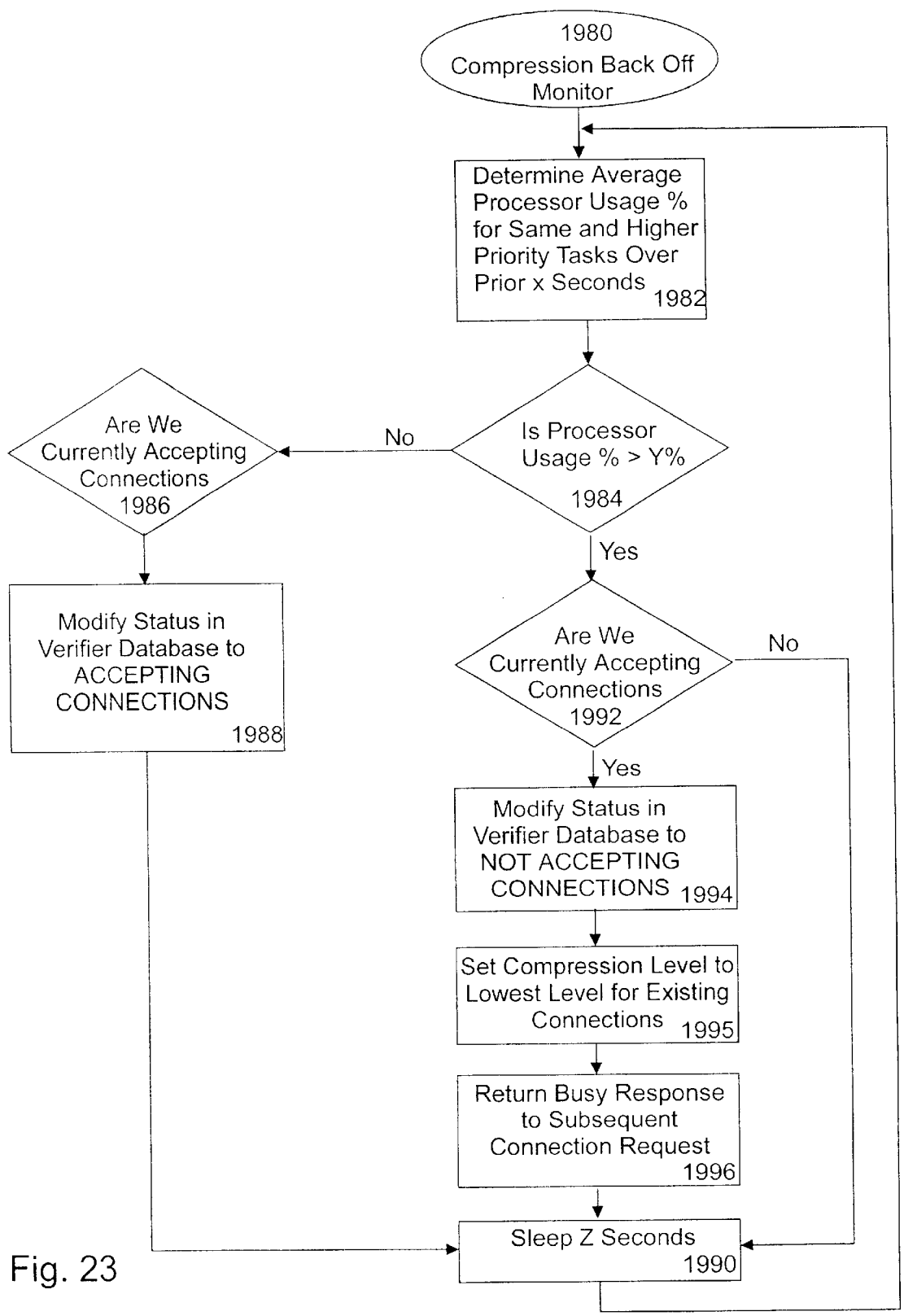
FIG. 23 illustrates a flow chart of the operations of the present invention corresponding to a compression device of the invention which enables/disables the compression/decompression unit.

At this point, the CVA 54 (or FOS 18) deploys 1980 a Compression Backoff Monitor (CBM) 151 as depicted in FIG. 23. The CBM 151 determines 1982 average processor usage percentage for same or higher priority tasks over a prior predetermined number (x) of seconds. CBM 151 determines 1984 whether the average processor usage is greater the a predetermined percentage process capacity (y %).

If No, CBM 151 determines 1986 whether CVA 54, for example, is currently accepting connections. CVA 54 modifies 1988 status in Verifier Database to Accepting Connections and sleeps 1990 for a preset number of seconds (z).

If yes to step 1986 CVA 54, for example, determines 1992 whether CVA 54, for example, is currently accepting connections. If No, CVA 54 sleeps 1990 for a preset number of seconds (z). If yes, CVA 54 modifies 1994 status in Verifier Database to Not Accepting Connections. CVA 54 sets compression level for existing connections 1995 down to the lowest level. CVA 54 returns 1996 a busy signal response to subsequent connection requests. The steps relating to CBM 151 are inserted prior to invoking CD 51.

Once in accepting mode from the CBM 151, CVA 54 "invokes" 1964 CD 51 to compress based on objective characteristics. CVA 54 "stores" 962 objects (x) into cache. CVA 54 "asks" 958 "is the object in cache and fresh?" If no, CVA 54 "sets" 960 "x=x+1" and returns to operation 956. If the answer to operation 956 and 958 is yes, CVA 54 "streams" 970 compressed set of fresh objects back to NFOC 42 via NTL.

NFOC 42 "obtains" 904 stream of fresh objects response from CVA 54. NFOC 42 "invokes" CD 47 and updates object collection replica via ORSI 27. NFOC 42 "sends" 904 a signal back to ORA 31 that replication is complete.

When CD 47 or CD 51 (either referred to as CD in this paragraph) is invoked, the operations under 920 are performed. CD "asks" 922 "is this a decompress request?" If no, CD "asks" 924 "can it be determined that negligible benefits will result from compression using available techniques? If no, CD "asks" 926 "can an appropriate compression method be determined?" If no, CD "selects" 928 a default compression method. CD "asks" 936 "did a sample of the default compression method yield good results? In this embodiment, results are deemed to be "good" if the application of the compression algorithm would result in a faster overall process. For example the CPU time required to perform the compression may be greater then the time it takes to transfer the additional bytes of an uncompressed data object if the speed of the communication link is very fast. The CD takes into consideration the speed of the communication link when determining if the results of the object sample yielded "good" results. If no, CD "selects" 932 compression method as none. If the results of 936 are good, CD "emits" 938 a stream of uncompressed data to one of permanent disk storage and to an in-memory buffer depending on invoker's request parameters. If the answer to operation 924 was yes, then operations 932 and 938 are followed. If the answer to operation 926 is yes, CD "selects" 934 the compression method that is appropriate for the object type and operation 938 follows. If the answer to operation 922 is yes, CD "selects" 930 a decompression method that corresponds to the compression method used. CD "emits" 940 a stream of uncompressed data to one of permanent disk storage and to an in-memory buffer depending on invoker's request parameters.

Though not shown in FIGS. 900 and 950, it is contemplated that similar methods are employed for "pushing" object updates from the remote client via NFOC 42 to the Server Computer 18 when processing the REPLICATION-SYNCRONIZE request. To apply the methods to the "push" of object updates, NFOC 42 employs a replication analyzer 31' to format the object updates into a contiguous "stream" applying compression when appropriate. Similarly, the Server 18 employs a replication synchronizer 61' to process the object updates from the stream and apply the updates to the local object collection. This embodiment is depicted in FIG. 2a, wherein operative elements of the former CVA 54 have been incorporated into the Server 18.

By way of example, the following packet formats define this client server protocol:

```
//
//    TYPE DEFINITIONS
//
        BYTE =>an 8 bit value (octet) unsigned
        DWORD => a 16 bit value in which network byte ordering is not important
        WORD => 32 bit value in which network byte ordering is not important
        MDWORD => 32 bit value in which network byte ordering is important and
represented            using "motorola or big endian" format
//    START CONNECTION REQUEST
        typedef struct {
              BYTE bFunctionCode;   // always 0x00
              BYTE bResv; //
              WORD wSequenceValue; //
}     CVP_START_CONNECTION_REQ, *pCVP_START_CONNECTION_REQ;
//    START CONNECTION RESPONSE
        typedef struct {
        BYTE bFunctionCode;        // always 0x80
        BYTE bStatus;//
        WORD wSequenceValue        // Same value as in request
        DWORD dConnectionHandle; //
}     CVP_START_CONNECTION_RSP, *pCVP_START_CONNECTION_RSP;
//    END CONNECTION REQUEST
        typedef struct }
        BYTE bFunctioncode;        // always 0x01
        BYTE bResv; //
        WORD wSequencevalue; //
        DWORD dConnectionHandle; //
        // as returned on start connection
}     CVP_END_CONNECTION_REQ, *CVP_END_CONNECTION_REQ;
//    END CONNECTION RESPONSE
        typedef struct {
        BYTE bFunctionCode;        // always 0x81
        BYTE bStatus;              //
        WORD wSequencevalue;       // Same value as in request
}     CVP_END_CONNECTION_RSP, *pCVP_END_CONNECTION_RSP;
//    OPEN OR CREATE FILE REQUEST
        typedef struct {
        BYTE bfunctioncode;        // always 0x02
        BYTE bResv; //
        WORD wSequenceValue; //
        DWORD dConnectionHandle; // As returned on START_CONNECT
        MDWORD dFileAttributesMask; //
        BYTE zFilePath[512]; //null terminated file name
}     CVP_OPEN_OR_CREATE_FILE_REQ, *pCVP_OPEN_OR_CREATE_FILE_REQ;
//    OPEN OR OR CREATE FILE RESPONSE
        typedef struct {
```

```
            BYTE bFunctionCode;        // always 0x82
            BYTE bStatus;          //
            WORD wSequenceValue;          // Same value as in request
            DWORD dVerifiersFileHandle; //
}       CVP_OPEN_OR_CREATE_FILE_RSP, *pCVP_OPEN_OR_CREATE_FILE_RSP;
//      CLOSE FILE REQUEST
            typedef struct {
            BYTE bFunctionCode;         // always 0x03
            BYTE bResv;          //
            WORD wSequenceValue; //
            DWORD dConnectionHandle; // As returned on START_CONNECT
            DWORD dVerifiersFileHandle; // As returned on OPEN_OR_CREATE
}       CVP_CLOSE_FILE_REQ *pCVP_CLOSE_FILE_REQ;
//      CLOSE FILE RESPONSE
typedef struct {
            BYTE bFunctionCode;         // always 0x83
            BYTE bStatus; //
            WORD wSequenceValue;            // Same value as in request
}       CVP_CLOSE_FILE_RSP, *pCVP_CLOSE_FILE_RSP;
//      LOCK REGION REQUEST
            typedef struct {
            BYTE bFunctionCode;         // always 0x04
            BYTE bResv; //
            WORD wSequenceValue; //
            DWORD dConnectionHandle; //As returned on START_CONNECT
            DWORD dVerifiersFileHandle; // As returned on OPEN_OR_CREATE
            MDWORD dSeekValue;        //offset into file
            MDWORD dLength; //number of bytes to lock
}       CVP_LOCK_REGION_REQ, *pCVP_LOCK_REGION_REQ;
//      LOCK REGION RESPONSE
            typedef struct {
            BYTE bFunctionCode;         // always 0x84
            BYTE bStatus; //
            WORD wSequenceValue;            // Same value as in request
            DWORD      dVerifiersLockHandle;
}       CVP_LOCK_REGION_RSP, *pCVP_LOCK_REGION_RSP;
//      UNLOCK REGION REQUEST
            typedef struct {
            BYTE bFunctionCode;         // always 0x05
            BYTE bResv; //
            WORD wSequenceValue;   //
            DWORD dConnectionHandle;//As returned on START_CONNECT
            DWORD dVerifiersLockHandle; // As returned LOCK REGION
}       CVP_UNLOCK_REGION_REQ, *pCVP_UNLOCK_REGION_REQ;
//      UNLOCK REGION RESPONSE
            typedef struct {
            BYTE bFunctionCode;         // always 0x85
            BYTE bStatus,
            WORD wSequenceValue;            // Same value as in request
}       CVP_UNLOCK_REGION_RSP. *pCVP_UNLOCK_REGION_RSP;
//      VERIFY REGION REQUEST
            typedef struct {
            BYTE bFunctionCode;         // always 0x06
            BYTE bResv;    // if status is not 0xF1
            WORD wSequenceValue; //
            DWORD dConnectionHandle; // As returned on START_CONNECT
            DWORD dVerifiersFileHandle; // As returned on OPEN_OR_CREATE
            MDWORD dSeekValue; // offset into file
            MDWORD dLength; //number of bytes to verify
            BYTE Signature[8]; //CRC adaptation
}       CVP_VERIFY_REGION_REQ, *pCVP VERIFY_REGION_REQ;
//      VERIFY REGION RESPONSE # 1 (not locked data)
            typedef struct {
            BYTE bFunctionCode;         // always 0x86
            BYTE bStatus;   //
            WORD wSequenceValue;            // Same value as in request
}       CVP_VERIFY_REGION_RSP, *pCVP_VERIFY_REGION_RSP;
//
//      VERIFY REGION RESPONSE #2
//      (if signatures did not match and region was locked)
//
            typedef struct {
            BYTE bFunctionCode;         // always 0x86
            BYTE bStatus;        //status = 0xF1 for this case
            WORD wSequenceValue;            // Same value as in request
            MDWORD dLength;           // # of bytes that follow
            char TheData[];       //
}       CVP_VERIFY_REGION_RSP, #pCVP_VERIFY_REGION_RSP;
//      READ REGION REQUEST
```

-continued

```
//      (sent only when reading from a locked region)
            typedef struct {
            BYTE bFunctionCode;         // always 0x07
            BYTE bResv;                 //
            WORD wSequenceValue;        //
            DWORD dConnectionHandle;    // As returned on START_CONNECT
            DWORD dVerifiersFileHandle; // As returned on OPEN_OR_CREATE
            MDWORD dSeekValue;          //offset into file
            WDWORD dLength;             // number of bytes to read
}       CVP_READ_REGION_REQ, *pCVP_READ_REGION_REQ;
//
//      READ REGION RESPONSE
//
            typedef struct {
            BYTE bFunctionCode;         //always 0x87
            BYTE bStatus;               //status 0xF1 for this case
            WORD wSequenceValue;        // Same value as in request
            MDWORD dLength; // # of bytes that follow
            cbar TheData[];   //
}       CVP_READ_REGION_RSP, *pCVP_READ REGION RSP;
//
//      WRITE REGION REQUEST
//      (sent only for when writing to a looked region)
//
            typedef struct {
            BYTE bFunctionCode;         // always 0x08
            BYTE bResv; //
            WORD wSequenceValue; //
            DWORD dConnectionHandle;    // As returned on START_CONNECT
            DWORD dVerifiersFileHandle: // As returned on OPEN_OR_CREATE
            MDWORD dSeekValue; // offset into file
            MDWORD dLength; // number of bytes to write
            BYTE TheData []; // data to be written
}       CVP_WRITE_REGION_REQ, *pCVP_WRITE_REGION_REQ;
//      WRITE REGION RESPONSE
            typedef struct {
            BYTE bFunctionCode;         // always 0x88
            BYTE bStatus;               //status
            WORD wSequenceValue;        // Same value as in request
            DWORD dLength;      // # of bytes written
}       CVP_WRITE_REGION_RSP, *pCVP_WR1TE_REGION_RSP;
//
//      VERIFY DIRECTORY REQUEST
//
typedef struct {
            BYTE   bFunctionCode;       // always 0x0A
            BYTE   bResv;               //
            WORD   wSequenceValue;      //
            DWORD dConnectionHandle;    // As returned on START_CONNECT
            MDWORD wFilesInDirectory Count; //
            MDWORD dAttributeMask;      // 0x00000001 = read only file
                                        // 0x00000002 hidden file
                        // 0x00000004 = system file
                        // 0x00000008 = volume label
                        // 0x00000010 = directory
                        // 0x00000020 = changed and not archived
            BYTE   Signature[8];        //
        BYTE   zSearchPath[512];  //null terminated file name
}       CVP_VERIFY_DIRECTORY_REQ, *pCVP_VERIFY_DIRECTORY_REQ;
//      VERIFY DIRECTORY RESPONSE RESPONSE
typedef struct {
            BYTE   bFunctionCode;       // always 0x8A
            BYTE   bStatus;             //
            WORD   wSequenceValue;      // Same value as in request
            BYTE   Signature[8];        //
}       CVP_VERIFY_DIRECTORY_RSP, *pCVP_VERIFY_DIRECTORY_RSP;
//
//      GET OBJECT REQUEST HEADER
//
typedefstruct {
        BYTE   bFunctionCHSe;           // always 0x48
        BYTE   bResv;                   //
        DWORD   dMessageLen;
        WORD   wSequenceValue;          //
        DWORD   dConnectionHandle;      //
        DWORD   dVerifiersDbHandle;     // 0 for Web Objects
#define HAPPROT_HTTP                    1       // 1 = HTTP type get request
#define HAPPROT_LOTUSNOTES              2       // 2 = Lotus Notes type Get request
 BYTE   *bProtocol;
```

-continued

```
    BYTE  bCommandBlockCount;       // Number of GetObject command blocks which follow
}   HAP_GET_OBJECT_REQHDR, *pHAP_GET_OBJECT_REQHDR;
//
//    GET OBJECT REQUEST
//
typedef struct {
    HAP_GET_OBJECT_REQHDR Hdr;     // fixed header
    BYTE  FirstCommandBlock[1];
    BYTE  sMd5Signature[16];        // if packet signatures required
}   HAP_GET_OBJECT_REQ, *pHAP_GET_OBJECT_REQ;
//
//    GET OBJECT COMMAND BLK HEADER
//
typedef struct {
    MDWORD dLength;         // Length of command block
#define GETOBJCMD_F_GETOBJECT          0x01    // 1=Get Object
#define GETOBJCMD_F_GETOBJECT EMB      0x02    // 2=Get Object and Embedded Objects
#define GETOBJCMD_F_VEROBJECT          0x04    // 4=Verify Object
                                //if 0x01 also on the retrieve object
#define GETOBJCMD_F_GETDIROBJECT       0x08    // 8=Get directory object
#define GETOBJCMD_F_VERDIROBJECT       0x10    // 10=Verify Dir Object
            // if 0x08 also on the retrieve object
#define GETOBJCMD_F_REPLDB 0x20                // 20=Replicate Data Base
        WORD  wFunction; // Function of command block
#define GETOBJCMD_M_OPENFLAGS_INC              0x01      // 0x01 = Object open flags
included
#define GETOBJCMD_M_COMPSLOT_INC               0x02      // 0x02 = Compression Slot
Follows
#define GETOBJCMD_M_OBJNAME_INC 0x04           // 0x04 = Object Name Follows
#define GETOBJCMD_M_PAYLOAD_INC 0x08           // 0x08 = Payload included in command
#define GETOBJCMD_M_VERINFO_INC                0x10      // 0x10 = Verification Info
Follows
#define GETOBJCMD_M_REPLINFO_INC 0x20          // 0x20 = Verification Info Follows
        WORD  wMask,                    // Additional info for command block
}
HAP_GET_OBJECT_COMMAND_BLOCKHDR,*pHAP_GETOBJECT_COMMAND
_BLOCKHDR;
//Same as Lotus' TIMEDATE struct, this frees this file from
//dependencies on their include files
typedef struct {
        DWORD Innards[2];
}   HAP_TGTIMEDATE, *pHAP_TGTIMEDATE;
typedef struct {
        HAP_TGTIMEDATE TimeDate;
        DWORD       dFirstNoteID;
}HAP_REPLICATE,*pHAP_REPLICATE;
//
//    GET OBJECT COMMAND BLK
//
typedef struct {
    HAP_GET_OBJECT_COMMAND_BLOCKHDR Hdr;         // Fixed Header
    MWORD  wOpenFlags;                   // (if bMask|=0x02)
    MWORD  wSlot;                        // Compression slot (if bMask|=0x01)
    BYTE   sObjectName[1];               // (if bMask|=0x04) Variable Length
    DWORD  dPayloadLen;                  // (if bMask|=0x04) Length of Payload
    BYTE   UserData[1];                  // (if bMask|=0x04) Payload, Variable Length
#define GETOBJCMD_VST_32FCS              // 1=32 bit FCS of object payload
#define GETOBJCMD_VST_LNSEQ         2         // 2=Lotus Notes Sequence #
#define GETOBJCMD_VST_WLMD          3         // 3=Web Last Modified Dates
#define GETOBJCMD_VST_WET           4         // 4=Web Entity Tags
    BYTE   bVerifierSignatureType;       // (if bMask|=0x08)
    MWORD  wVerifierSignatureLength;          // (if bMask|=0x08)
  BYTE sVerifierSignature[1];            // (if bMask|=0x08) Signature, Variable Length
    HAP_REPLICATE ReplicateInfo;         // replication info structure
}
HAP_GET_OBJECT_COMMAND_BLOCK,*pHAP_GET_OBJECT_COMMAND_BLO
CK;
//
//    GET OBJECT RESPONSE HEADER
//
typedef struct {
    BYTE  bFunctionCHSe;         // always 0xC8
    BYTE  bStatus;               //
    DWORD dMessageLen;
    WORD  wSequenceValue;        // corresponds to original request
    DWORD dConnectionHandle;     //
    DWORD dVerifiersDbHandle;    // 0 for Web Objects
    BYTE  bProtocol;.
    BYTE  bResponseBlockCount;   // Number of GetObject response blocks
```

```
                // which follow
}   HAP_GET_OBJECT_RSPHDR, *pHAP_GET_OBJECT_RSPHDR;
//
//   GET OBJECT RESPONSE
//
typedef struct {
    HAP_GET_OBJECT_RSPHDR Hdr;         // fixed header
    BYTE  FirstResponseBlock[1];
    BYTE  sMd5Signature[16];  // if packet signatures required
}   HAP_GET_OBJECT_RSP, *pHAP_GET_OBJECT_RSP;
//
//   GET OBJECT RESPONSE BLK HEADER
//
typedef struct {
    MDWORD dLength;           // Length of response block
#define GETOBJRSP_F_FIC 1              // 0x01 = The first piece of an object (more to follow)
#define GETOBJRSP_F_MIC         2 // 0x02 = A middle piece of an object (more to follow)
#define GETOBJRSP_F_LIC 4 // 0x04 = The last piece of an object
#define GETOBJRSP_F_OIC (GETOBJRSP_F_FIC | GETOBJRSP_F_LIC) // 5=Entire
Object
#define GETOBJRSP_F_VERACK 8           // 0x08 = Verification Acknowledgement
#define GETOBJRSP_F_GETACK 0x10        // 0x10 = Get Acknowledgement
#define GETOBJRSP_F_REPLACK 0x20       // 0x20 = Replication Acknowledgement
    WORD  wFunction;   // Function of response
#define GETOBJRSP_M_COMPSLOT_INC0x01           // 0x01 = Compression Slot Follows
#define GETOBJRSP_M_OBJNAME_INC        0x02    // 0x02 Object Name Follows
#define GETOBJRSP_M_VERINFO_INC        0x04    // 0x04 = Verification Info Follows
#define GETOBJRSP_M_NAMEIMP 0x08               // 0x08 = Name Implied by previous command
#define GETOBJRSP_M_PAYLOAD_INC        0x10    // 0x10 = Payload included
#define GETOBJRSP_M_ERRORLOC           0x20    // 0x20 = Error locating object
    WORD wMask;               // Additional info for response block
}   H A P _ G E T _ O B J E C T _ R E S P O N S E _ B L O C K H D R ,
*pHAP_GET_OBJECT_RESPONSE BLOCKHDR;
//
//   GET OBJECT RESPONSE BLK
//
typedef struct {
    HAP_GET_OBJECT_RESPONSE_BLOCKHDR    Hdr; // fixed header;
    MWORD  wSlot;                  // (ifbMask|=0x01) Compression slot
    BYTE   sObjectName[1];         // (if bMask|=0x02) Object Name, Variable
Length
    MDWORD dObjectPayloadLength;   // (if bMask|=0x10)   Length of Payload
    MDWORD dObjectPayUnCompLength; // (if bMask|=0x10) UnCompressed Payload
Length
    WORD   wCompressionAlgorithm;  // (ifbMask|=0x10) Compression Algorithm
    BYTE   ObjectData[1];          // (ifbMask|=0x10) Payload, Variable Length
    MDWORD dErrorStatus;           // (if bMask|=0x20) Error status
}
HAP_GET_OBJECT_RESPONSE_BLOCK,*pHAP_GET_OBJECT_RESPONSE_BLOCK;
```

In order to generate the signature, each BSG 44 and 56 employ a protocol for performing a cyclic redundancy check (CRC) on the specified data which includes signature and coordinates (an offset into the file and specifying length of the data). The protocol the CRC employs is a fast method for generating a 64 bit CRC on a 32 bit CPU, The existing bit structure on a 32 bit CPU is that of the type pppfcs 32 algorithm described in RFC1662.TXT by W. Simpson.

The invention modifies the structure as follows: The 64 bit value will consist of two parts:

1. The existing 32 bit value will be utilized.
2. An additional 32 bits will be derived by dividing the length by four and performing the operation on four groups of the byte stream. On each of the four instances the least significant 8 bytes of the "in progress" frame check sequence (a 32 bit value computed by repetitively exclusive-oring a constant retrieved by indexing a character stream into a table of contents) will be appended to a second 32 bit number which was initialized to zero.

Modification is as follows:

```
/*Function*/ void PppFcs64(cp, len, fcsarray)
//
// Calculate an 8 new FCS given the current FCS and the new, data.
// Note! Do not attempt to use this if the length of the
// data stream is less than eight bytes.
//
//
)
register u32 fcs;
register unsigned char *cp;
register int len, remainder;
register unsigned char fcsarray[8]
{
register int 1, lenBy4;
    fcs 0
    LenBy4 = len>> 2; // Divide length by 4 (shift right 2)
    remainder = len - (LenBy4+LenBy4+LenBy4);
    fcs = pppfcs32( fcs, cp, LenBy4);
    fcsarray[4] = (unsigned char) fcs;
    cp += LenBy4;
    fcs = pppfcs32( fcs cp, LenBy4 );
    fcsarray[5] (unsigned char) fcs;
```

```
        cp += LenBy4;
        pppfcs32( fcs, cp, LenBy4);
        fcsarray[6] - (unsigned char) fcs;
        cp +== LenBy4;
        fcs = pppfcs32( fcs, cp, Remainder);
        fcsarray[7] (unsigned char) fcs;
        *(( unsigned long *) fcsarray) ntohl( fcs );
```

These signatures of data which are generated are placed through the comparator 58, which, for example, are in this case associated with the cache verifying computer 14. It is recognized that other locations for the comparator 34 may exist. The comparator; 34 then determines whether the signatures of data match. It is recognized that other types of verification tools may be employed to carry out the present invention such as the MD5 algorithm which is described in RFC1322.TXT by R. Rivest.

In order to generate the Signature of Directory, the DSG 57 is employed by the CVA 53. Referring to FIG. 750, the procedure used to calculate the Signature of directory is described below:

```
typedef struct {
        BYTE  bCentury;       // 0x13 means nineteen hundred something
        BYTE  bYear;          // 0x60 means 96
        BYTE  bMonth;         // 0x01 means January, 0x0c = dec.
        BYTE  bDay;           // 0x01 through 0x1F
        BYTE  bHour;          // 0x00 thru 0x17
        BYTE  bMinute;        // 0x00 thru 0x3B
        BYTE  bSecond;        // 0x00 thru 0x3B
} NETWORK_TIME, *PNETWORK_TIME;
typedef struct {
        BYTE  zFileName[ 32 ];   // null padded
        NETWORK_TIME sTime;
        MDWORD dSize;            // up to 4 Gig.
} DIR_SUBOBJECT;
```

With respect to the operative steps 750 et seq., the CVA 54 initializes 751 the signature to a value of zero. CVA 54 retrieves 752 the first directory sub-object from FS 18 and expresses this as described in the DIR_SUBOBJECT data structure. CVA 54 asks "is this the last directory sub-object?" 753. If the answer is no then CVA 54 factors 754 the signature of the sub-object into the signature of directory by invoking the logic CSXorDirEntry below:
void CSXorDirEntry(BYTE *1pSignature,POD_DIR_INFO 1pOdDirInfo)
{
DWORD *1pdSign=(DWORD *)1pSignature;
DWORD *1pdDirInfo=(DWORD *)1pOdDirInfo;
int I;
int j=0;
    for (I=0;i<(sizeof(OD_DIR_INFO)/sizeof(DWORD));I++,1pdDirInfo++)
    {
    1pdSign[j]^=*1pdDirInfo;
    j=1-j;
    }
}

CVA 54 then retrieves the next directory sub-object from FS 18 and proceeds to 753. If the answer to 753 is yes the then CVA 64 "sends" 756 back to NFOC 42 via reverse channel.

The remote client computer 12 is also preferably designed with a predefined portion of its memory 34 operably associated with the NFOC 42 for storing a hit ratio @ defined as the percentage of times that a READ request for a particular data was successfully verified to be in cache memory out of a predetermined number of attempted verifications. The remote client computer 12 employs HRA 45 as an operative means which keeps a record of file names that have been determined to be unworthy of caching because previously determined hit ratios fell below the predetermined threshold and, thus, future accesses of the data to such files will be inhibited from being subject to the processes defined herein. In other words, the HRA 45 dumps data from cache memory if the data associated hit ratio was less than a predetermined number, otherwise the data remains in cache memory.

Still, another embodiment of the invention is set forth hereinafter. The exemplary code sets forth operations of determination of whether the data objects are to be transferred via the WAN or LAN, initiating compressing/decompressing the data objects upon determining the mode of transfer, i.e., through the WAN or LAN, and assembling/disassembling the data objects into a stream.

```
//
// Prime Replication REQUEST
//
typedef struct {
        BYTE  bFunctionCHSe;      // always 0x4e
        BYTE  bResv;              //
        DWORD dMessageLen;
        WORD  wSequence Value;    //
        DWORD dConnectionHandle;  //
        DWORD dVerifiersDbHandle; // 0 for Web Objects
        BYTE  ReplList[1];
} HAP_PRIME_REPL_REQ,*pHAP_PRIME_REPL_REQ;
//
// Prime Replication RESPONSE
//
typedef struct {
        BYTE  bFunctionCHSe;      // always 0x4e
        BYTE  bStatus;            //
        DWORD dMessageLen;
        WORD  wSequenceValue;     //
        DWORD dConnectionHandle;  //
        DWORD dVerifiersDbHandle; // 0 for Web Objects
        WORD  wReplStatus;
} HAP_PRIME_REPL_RSP,*pHAP_PRIME_REPL_RSP;
//
// Starting Replication Response - not used right now
//
typedef struct {
        BYTE  bFunctionCHSe;      // always 0x4B
        BYTE  bStatus;            //
        DWORD dMessageLen;
        WORD  wSequenceValue;     // Same value as in request
        DWORD dVerifiersDbHandle; //
        WORD  wReplStatus;
        DWORD dNoteCount;         // Number of notes which will
be retrieved for this replicate
} HAP_START_REPL_RSP,*pHAP_START_REPL_RSP;
//
// STOP SENDING REQUEST
//
typedef struct {
        BYTE  bFunctionCHSe;      // always 0x49
        BYTE  bResv;              //
        DWORD dMessageLen;
        WORD  wSequenceValue;     //
        DWORD dConnectionHandle;  //
        DWORD dVerifiersDbHandle; // 0 for Web Objects
        DWORD dReason;
} HAP_STOP_SENDING_REQ,*pHAP_STOP_SENDING_REQ;
//
// FLUSH REQUEST
//
typedef struct {
        BYTE  bFunctionCHSe;      // always 0x49
        BYTE  bResv;              //
```

```
                -continued
        DWORD    dMessageLen;
} HAP_FLUSH_REQ,*pHAP_FLUSH_REQ;
//
// FLUSH RESPONSE
//
typedef struct {
        BYTE     bFunctionCHSe;      // always 0x49
        BYTE     bResv;              //
        DWORD    dMessageLen;
        WORD     wSequenceValue;     //
        DWORD    dConnectionHandle;  //
        DWORD    dVerifiersDbHandle; // 0 for Web Objects
} HAP_FLUSH_RSP,*pHAP_FLUSH_RSP;
//
// PUT OBJECT REQUEST HEADER
//
typedef struct {
        BYTE     bFunctionCHSe;      // always 0x4f
        BYTE     bResv;              //
        DWORD    dMessageLen;
        WORD     wSequenceValue;     //
        DWORD    dConnectionHandle;  //
        DWORD    dVerifiersDbHandle; // 0 for Web Objects
        BYTE     bProtocol;
        BYTE     bCommandBlockCount; // Number of GetObject
                                     // command blocks which follow
} HAP_PUT_OBJECT_REQHDR,*pHAP_PUT_OBJECT_REQHDR;
//
// PUT OBJECT REQUEST
//
typedef struct {
        HAP_PUT_OBJECT_REQHDR Hdr;   // fixed header
        BYTE     FirstCommandBlock[1];
} HAP_PUT_OBJECT_REQ,*pHAP_PUT_OBJECT_REQ;
//
// PUT OBJECT COMMAND BLK HEADER
//
typedef struct {
        MDWORD   dLength;            // Length of command block
#define PUTOBJCMD_F_PUTOBJECT         0x08   // 08=
Send this Object to verifier
#define PUTOBJCMD_F_PUSHREPLDB        0x10   // 10=Push
Replicate start request
#define PUTOBJCMD_F_PUSHREPLDBCMPLT   0x20   // 20=
Push Replicate cmplt request
        WORD     wFunction;          // Function of command block
        WORD     wMask;              // Additional info for command block
}
HAP_PUT_OBJECT_COMMAND_BLOCKHDR,*pHAP_PUT_
OBJECT_COMMAND_BLOCKHDR;
//
// PUT OBJECT COMMAND BLK
//
typedef struct {
        HAP_PUT_OBJECT_COMMAND_       // Fixed Header
        BLOCKHDR Hdr;
        MWORD    wSlot;              // Compression slot (if bMask|=0x01)
        BYTE     sObjectName[1];     // (if bMask|=0x04) Variable Length
        DWORD    dErrorStatus;
        MDWORD   dObjectPayloadLength;      // (if bMask|=0x10)
        Length of Payload
        MDWORD   dObjectPayUnCompLength;    // (if bMask|=0x10)
        UnCompressed Length of Payload
        MWORD    wCompressionAlgorithm;     // (if bMask|=0x10)
        Compression Algorithm
        BYTE     ObjectData[1];             // (if bMask|=0x10)
Payload, Variable Length
}
HAP_PUT_OBJECT_COMMAND_BLOCK,*pHAP_PUT_OBJECT
COMMAND_BLOCK;
//
// PUT OBJECT RESPONSE HEADER
//
typedef struct {
        BYTE     bFunctionCHSe;      // always 0xC8
        BYTE     bStatus;            //
        DWORD    dMessageLen;
        WORD     wSequenceValue;     // corresponds to original request
        DWORD    dConnectionHandle;  //
```

```
                -continued
        DWORD    dVerifiersDbHandle; // 0 for Web Objects
        BYTE     bProtocol;
        BYTE     bResponseBlockCount; // Number of GetObject response
                                      // blocks which follow
} HAP_PUT_OBJECT_RSPHDR,*pHAP_PUT_OBJECT_RSPHDR;
//
// PUT OBJECT RESPONSE
//
typedef struct {
        HAP_PUT_OBJECT_RSPHDR Hdr;   // fixed header
        BYTE     FirstResponseBlock[1];
        BYTE     sMd5Signature[ 16 ]; // if packet signatures required
} HAP_PUT_OBJECT_RSP,*pHAP_PUT_OBJECT_RSP;
//
// PUT OBJECT RESPONSE BLK HEADER
//
typedef struct {
        MDWORD   dLength;            // Length of response block
        WORD     wFunction;          // Function of response
        WORD     wMask;              // Additional info for response block
} HAP_PUT_OBJECT_RESPONSE_BLOCKHDR,*pHAP_PUT_
OBJECT_RESPONSE_BLOCKHDR;
//
// PUT OBJECT RESPONSE BLK
//
typedef struct {
        HAP_PUT_OBJECT_RESPONSE_BLOCKHDR  // fixed header
        Hdr;
        BYTE     sObjectName[1];            // (if bMask|=0x02)
        Object Name, Variable Length
        MDWORD   dObjectPayloadLength;      // (if bMask|=0x04)
        Length of Payload
        MDWORD   dObjectPayUnCompLength;    // (if bMask|=0x04)
        UnCompressed Length of Payload
        WORD     wCompressionAlgorithm;     // (if bMask|=0x04)
        Compression Algorithm
BYTE ObjectData[1];                         // (if bMask|=0x04) Payload,
Variable Length
        MDWORD   dErrorStatus;              // (if bMask|=0x01) Error status
        WORD     wNumUpdateErrors;
}
HAP_OBJECT_RESPONSE_BLOCK*pHAP_PUT_OBJECT_
RESPONSE_BLOCK;
```

While the preferred embodiment has been set forth above, it is done so only by way of example and not intended to be limiting to the scope of the claims appended hereto. It is believed that modifications and variations of the present invention will be readily apparent to those skilled in the ail will be coming within the scope of the claims hereto.

What is claimed is:

1. A file/object server CPU having which utilizes data/object compression, which includes:
   a compression device having means for determining when processing said CPU reaches a predetermined percentage of maximum processing capacity, and means operably associated with said determining means for controlling compression of data/object upon reaching said predetermined percentage in a manner to aid processing to fall below said predetermined percentage.

2. The file/object server CPU of claim 1, wherein said controlling means enables compression of data/object upon falling below said predetermined percentage.

3. The file/object server CPU of claim 1, wherein said determining means is further characterized to monitor the processing capacity over time.

4. The file/object server CPU of claim 1, wherein said determining means is further characterized to determine average processor usage over a period of time for previously processed data/object.

5. The file/object server CPU of claim 4, wherein said previously processed data/object is of a size approximating a size of a to be processed data/object.

6. The file/object server CPU of claim 1, wherein said determining means is characterized to include means for evaluating average process usage percentage of data/object to be compressed prior to compression.

7. The file/object server CPU of claim 1, which is further characterized to include:
- a file/object server computer having an operating system, a first memory a permanent storage memory, and a processor;
- a remote client computer operably connected to said file/object server computer in a manner to rapidly transfer data objects, having an operating system, a first memory, a permanent storage memory, and a processor;
- a communication link operably connecting said remote client computer and said file/object server computer including means for routing between a WAN and a LAN; and
- means operably associated with one of said file/object server computer and said remote client computer for determining whether data objects are transferred through said WAN or said LAN;
- means for compressing said data/objects upon detecting transfer through said WAN; and
- means for assembling said data/objects into a stream and transferring said data objects through one of said WAN and said LAN.

8. The invention in accordance with claim 7, which includes means operably associated with one of said file/object server computer and said remote client computer for disassembling and decompressing said assembled data objects into individual data objects.

9. The invention in accordance with claim 7, which further includes means operably associated with one of said file/object server computer and said remote client computer for determining a list of objects to be transferred during a replication/synchronization process.

10. A method for increasing data access from data of the type including at least one of a file, an object and a directory in a file/object oriented network, which comprises:
- employing a file/object server computer having an operating system, a first memory, a permanent storage memory, and a processor, and which includes a compression device having means for determining when processing said server computer reaches a predetermined percentage of maximum processing capacity, and means operably associated with said determining means for controlling compression of data/object upon reaching said predetermined percentage in a manner to aid processing to fall below said predetermined percentage;
- employing means for compressing said data/object upon detecting transfer through said WAN; and
- employing means for assembling said data objects into a stream and transferring said data/ object through one of said WAN and said LAN.

11. The method of claim 10, which further includes:
- employing a remote client computer operably connected to said file/object server computer in a manner to rapidly transfer data objects, having an operating system, a first memory, a permanent storage memory, and a processor;
- employing a communication link operably connecting said remote client computer and said file/object server computer including means for routing between a WAN and a LAN; and
- employing means operably associated with one of said file/object server computer and said remote client computer for determining whether data objects are transferred through said WAN or said LAN.

12. The method of claim 10, which includes employing means operably associated with one of said file/object server computer and said remote client computer for disassembling and decompressing said assembled data objects into individual data objects.

13. The method of claim 10, which further includes employing means operably associated with one of said file/object server computer and said remote client computer for determining a list of objects to be transferred during a replication/synchronization process.

* * * * *